(12) United States Patent
Howard et al.

(10) Patent No.: US 7,181,701 B2
(45) Date of Patent: Feb. 20, 2007

(54) GLANCEABLE INFORMATION SYSTEM AND METHOD

(75) Inventors: Dane M. Howard, Sammamish, WA (US); Eric G. Lang, Yarrow Point, WA (US); R. Donald Thompson, III, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 10/336,228

(22) Filed: Jan. 3, 2003

(65) Prior Publication Data

US 2004/0130580 A1   Jul. 8, 2004

(51) Int. Cl.
*G06F 17/00* (2006.01)

(52) U.S. Cl. .............. 715/854; 715/855; 715/866; 715/864

(58) Field of Classification Search ........ 715/854–864, 715/745–778, 866, 802
See application file for complete search history.

(56) References Cited

U.S. PATENT DOCUMENTS

| | | | |
|---|---|---|---|
| 5,854,985 A | 12/1998 | Sainton et al. ............. | 455/553 |
| 6,212,414 B1 | 4/2001 | Alameh et al. ............ | 455/575 |
| 6,694,316 B1* | 2/2004 | Langseth et al. ........... | 707/10 |
| 2003/0154492 A1* | 8/2003 | Falvo et al. ............... | 725/113 |
| 2005/0066037 A1* | 3/2005 | Song et al. ................ | 709/227 |

FOREIGN PATENT DOCUMENTS

| | | |
|---|---|---|
| EP | 0 733 983 A2 | 9/1996 |
| WO | WO 99/12109 | 3/1999 |
| WO | WO 02/15607 A2 | 2/2002 |
| WO | WO 02/015607 A3 | 2/2002 |

OTHER PUBLICATIONS

Sinclair, "The FM Wristwatch Radio," last updated Jan. 7, 1997 1 pg.
Ambient, "Ambient Devices," Sep. 5, 2002, 3 pgs.
Ambient, "The Ambient Platform," Sep. 5, 2002, 2 pgs.

* cited by examiner

*Primary Examiner*—Tadesse Hailu
(74) *Attorney, Agent, or Firm*—Brett A. Hertzberg; Merchant & Gould PC

(57) ABSTRACT

An apparatus, system, and method are related to navigating through content on a device that includes stored information that is organized according to channels. Content that is associated with the channels is selected and viewed on a display of the device by means of passive interaction when the device is in a glance-view operating state. The device periodically changes the display according to a playlist that indexes selected channel views associated with the current channel. The selected channel views are selected from the available channels according to a rule set that is associated with the channel. After every item in the playlist is processed, the playlist is updated according to application of the rule set. A customized channel may include references to other channels such that channel views associated with the customized channel correspond to channel views from other channels.

21 Claims, 16 Drawing Sheets

GLANCEABLE INFORMATION SYSTEM AND METHOD

FIELD OF THE INVENTION

The present invention relates generally to user interfaces. More particularly, the present invention relates to a system and method for navigating though glanceable information.

BACKGROUND OF THE INVENTION

As society becomes increasingly mobile, mobile electronic devices are enjoying a tidal wave of popularity and growth. Cell phones, wireless PDAs, wireless laptops and other mobile communication devices are making impressive inroads with mainstream customers. Some types of mobile electronic devices are processor-controlled, with a user interface to allow the user to more easily and intuitively operate the device. For example, some mobile telephones include a display unit that displays graphical data to support email, web browser, and other non-voice features. Manufacturer of mobile electronic devices often utilize buttons on the mobile electronic device to navigate through various menus and display the graphical data.

SUMMARY OF THE INVENTION

An apparatus, system, and method are related to navigating through content on a device that includes stored information that is organized according to channels. Content that is associated with the channels is selected and viewed on a display of the device by means of passive interaction when the device is in a glance-view operating state. The device periodically changes the display according to a playlist that indexes selected channel views associated with the current channel. The selected channel views are selected from the available channels according to a rule set that is associated with the channel. After every item in the playlist is processed, the playlist is updated according to application of the rule set. A customized channel may include references to other channels such that channel views associated with the customized channel correspond to channel views from other channels. The glance operating state is exited when the user actively interacts with the device. The views on the device can be manually advanced through active user interaction when the glance operating state is exited. The glance operating state is entered after the timeout again expires without any further active user interaction.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
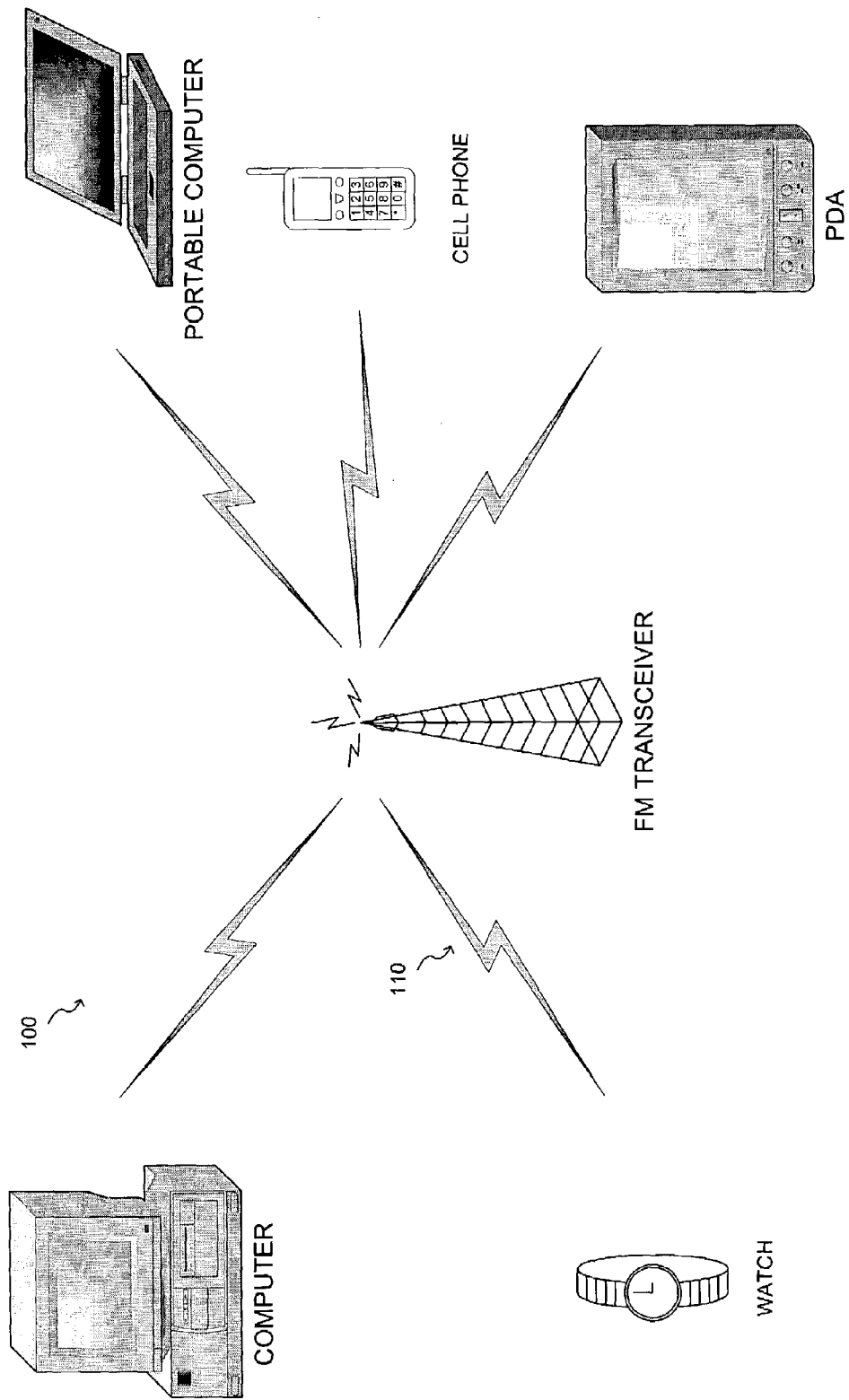
FIG. 1 is a diagram illustrating an operating environment.

The present invention is described in the context of a user interface for an electronic device. In the described embodiments, the electronic devices may be watch type devices that are specially configured to receive communication signals. As will become apparent from a reading of the following detailed description, the electronic devices may be configured to receive broadcast transmission from one or more broadcast towers. The electronic devices may be capable of receiving and processing messages from the broadcast transmissions. The electronic devices store the received information such that the information is indexed according to designated channels. After information is received and processed by the client device, a user may either passively or actively review the information that is stored in the electronic device. The user interface for the client device employs a glanceable information system that displays information that is of interest to a particular user.

Glanceable information is formatted such that a user can glance at the information on the display of the electronic device without requiring further navigation. One example of glanceable information is a stock quote, where the glanceable information is the call letters and the stock values. Another example of glanceable information is the current weather conditions in a designated region or city, where the glanceable information is the city/region name. Still another example of glanceable information is a brief headline of news. Further examples of glanceable information are within the scope of the present invention. Glanceable information is particularly useful in devices that have limited viewing areas such as a watch-type device, a cellular telephone, and the like.

Although described here in the context of a watch-based system, it will be apparent that the teachings of the application have equal applicability to any other mobile or non-mobile devices, such as portable and desktop computers, personal digital assistants (PDAs), cellular telephones, and the like. The use of a watch is for illustrative purposes only to simplify the following discussion, and may be used interchangeably with "mobile device" and/or "electronic device".

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

The apparatus, system, and method of the present invention are related to navigating through content on a device that includes stored information that is organized according to channels. Content that is associated with the channels is selected and viewed on a display of the device by means of passive interaction when the device is in a glance-view operating state. The device periodically changes the display according to a playlist that indexes selected channel views associated with the current channel. The selected channel views are selected from the available channels according to a rule set that is associated with the channel. After every item in the playlist is processed, the playlist is updated according to application of the rule set. A customized channel may include references to other channels such that channel views associated with the customized channel correspond to channel views from other channels. The glance operating state is exited when the user actively interacts with the device. The views on the device can be manually advanced through active user interaction when the glance operating state is exited. The glance operating state is entered after the timeout again expires without any further active user interaction.

The overall operating environment for the present invention will be discussed as follows below with reference to FIGS. 1–2.

Operating Environment

FIG. 1 illustrates an example operating environment (100) for the present invention. As illustrated in the figure, an FM transceiver or broadcast is transmitted over a communication channel (110) to various electronic devices. Example electronic devices that have an FM receiver or transceiver may include a desktop computer, a watch, a portable computer, a wireless cellular telephone (cell phone), and a personal data assistant (PDA). The electronic devices are arranged to receive information from the FM broadcast. The FM broadcast may be of any number of types including but not limited to: a standard FM transmission, a sub-carrier FM transmission, or any other type of FM transmission as may be desired.

Example electronic devices that may include an electronic system that is arranged to operate according to the interaction model are illustrated in FIG. 1. The electronic system may employ a wireless interface such as the FM transmission systems that are described above. Each of the electronic systems receives messages/information over the communication channel.

Each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: a time channel, a messages channel, a contact channel, a calendar channel, a weather channel, a stocks channel, a news channel, and a games channel. Messages associated with each channel include message content that is based on the particulars of the channel. For example, the weather channel may include the current weather in a local region, the current weather in a national region, and the current weather in an international region. In this example, each of the weather reports can be selected and reviewed by selecting the weather channel on the electronic device.

Illustrative Electronic System

Figure 2:
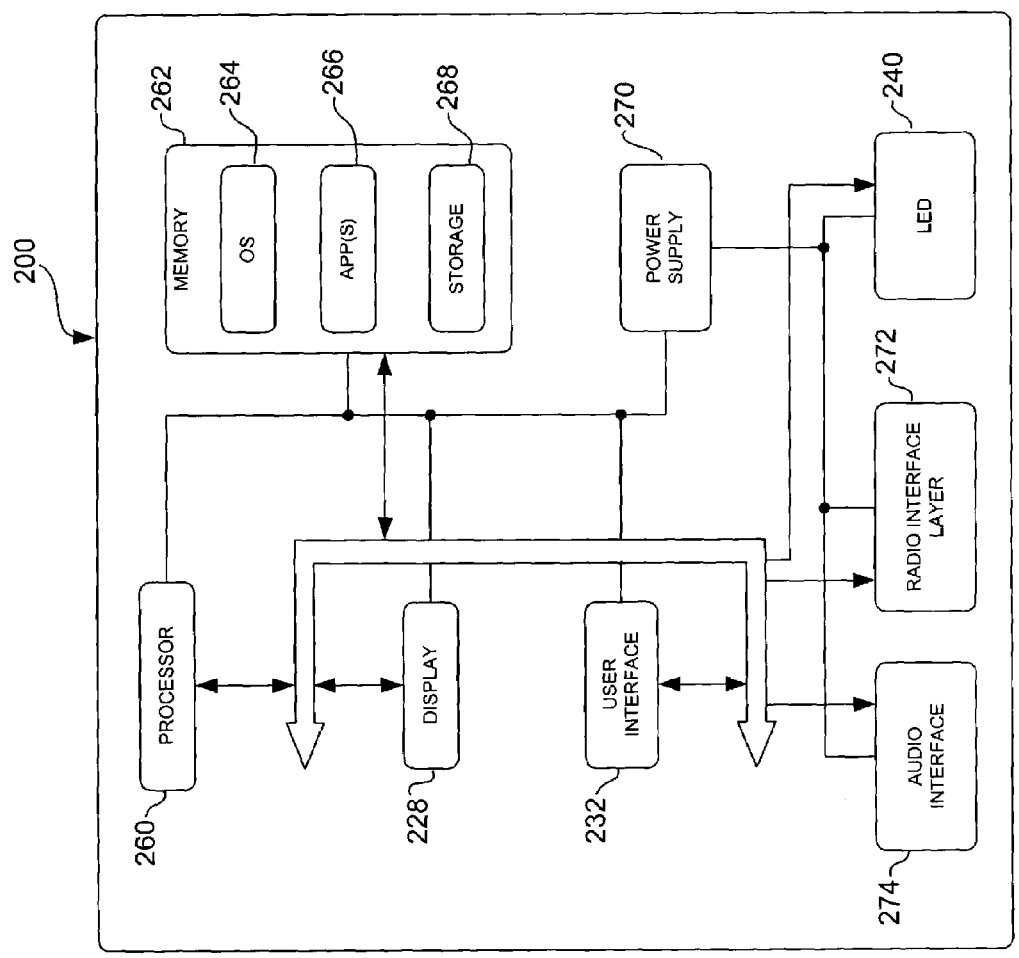
FIG. 2 is a schematic diagram illustrating an electronic device.

FIG. 2 is a schematic diagram illustrating functional components of an illustrative electronic device (200). The electronic device (200) has a processor (260), a memory (262), a display (228), and a user interface (232). The memory (262) generally includes both volatile memory (e.g., RAM) and non-volatile memory (e.g., ROM, Flash Memory, or the like). The electronic device (200) includes an operating system (264), such as the Windows CE operating system from Microsoft Corporation or another operating system, which is resident in the memory (262) and executes on the processor (260). The user interface (232) may be a series of push buttons, a scroll wheel, a numeric dialing pad (such as on a typical telephone), or another type of user interface means. The display (228) may be a liquid crystal display, or any other type of display commonly used in electronic devices. In one example, the display (228) may be touch-sensitive that would act as an input device.

One or more application programs (266) are loaded into memory (262) and run on the operating system (264). Examples of application programs include phone dialer programs, email programs, scheduling/calendaring programs, PIM (personal information management) programs, Internet browser programs, and so forth. The electronic device (200) also includes a non-volatile storage (268) that is located within the memory (262). The non-volatile storage (268) may be used to store persistent information which should not be lost if the electronic device (200) is powered down. The applications (266) may use and store information in the storage (268), such as e-mail or other messages used by an e-mail application, contact information used by a PIM, appointment information used by a scheduling program, documents used by a word processing application, and the like.

The electronic device (200) has a power supply (270), which may be implemented as one or more batteries. The power supply (270) might further include an external power source, such as an AC adapter or a powered docking cradle that supplements or recharges the batteries.

The electronic device (200) is also shown with two types of external notification mechanisms: an LED (240) and an audio interface (274). These devices may be directly coupled to the power supply (270) so that when activated, they remain on for a duration dictated by the notification mechanism even though the processor (260) and other components might shut down to conserve battery power. The LED (240) may be programmed to remain on indefinitely until the user takes action to indicate the powered-on status of the device. The audio interface (274) is used to provide audible signals to and receive audible signals from the user. For example, the audio interface (274) may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived message. The electronic device (200) can control each alert mechanism separately (e.g., audio, vibration, as well as visual cues).

The electronic device (200) also includes a radio interface layer (272) that performs the function of receiving and/or transmitting radio frequency communications. The radio interface layer (272) facilitates wireless connectivity between the electronic device (200) and the outside world, via a communications carrier or service provider. Transmissions to and from the radio interface layer (272) are conducted under control of the operating system (264). In other words, communications received by the radio interface layer (272) may be disseminated to application programs (266) via the operating system (264), and vice versa.

Figure 3A:
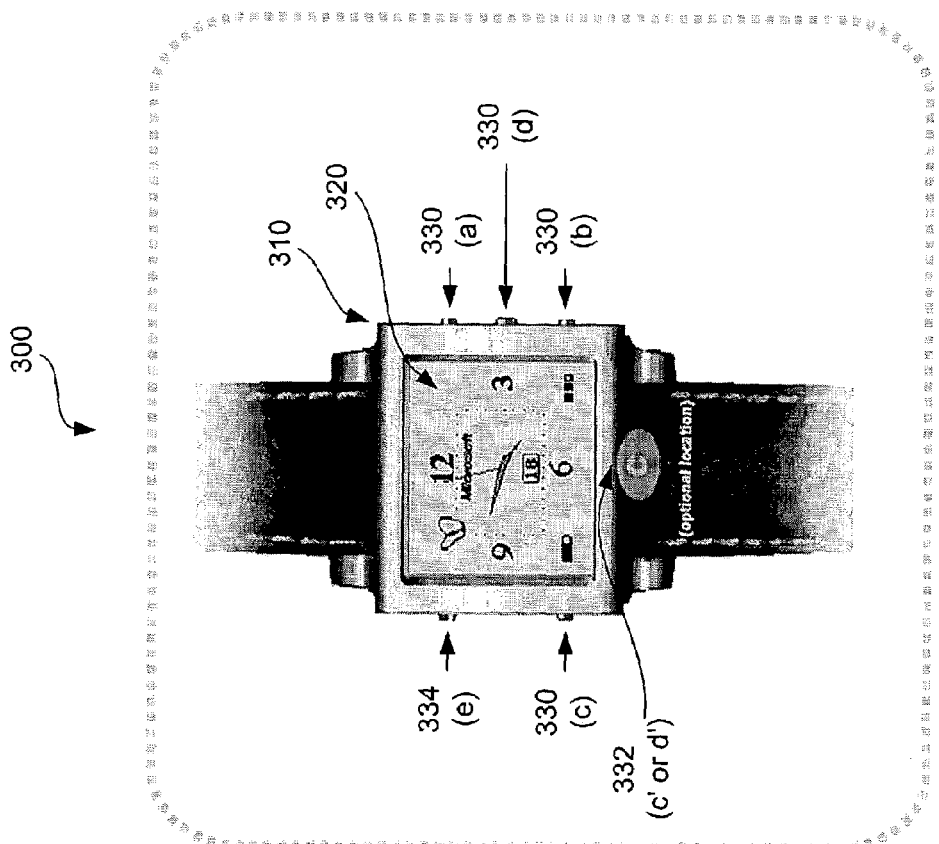
FIGS. 3A–3B are diagrams that illustrate watch devices that include a user interface.
Figure 3B:
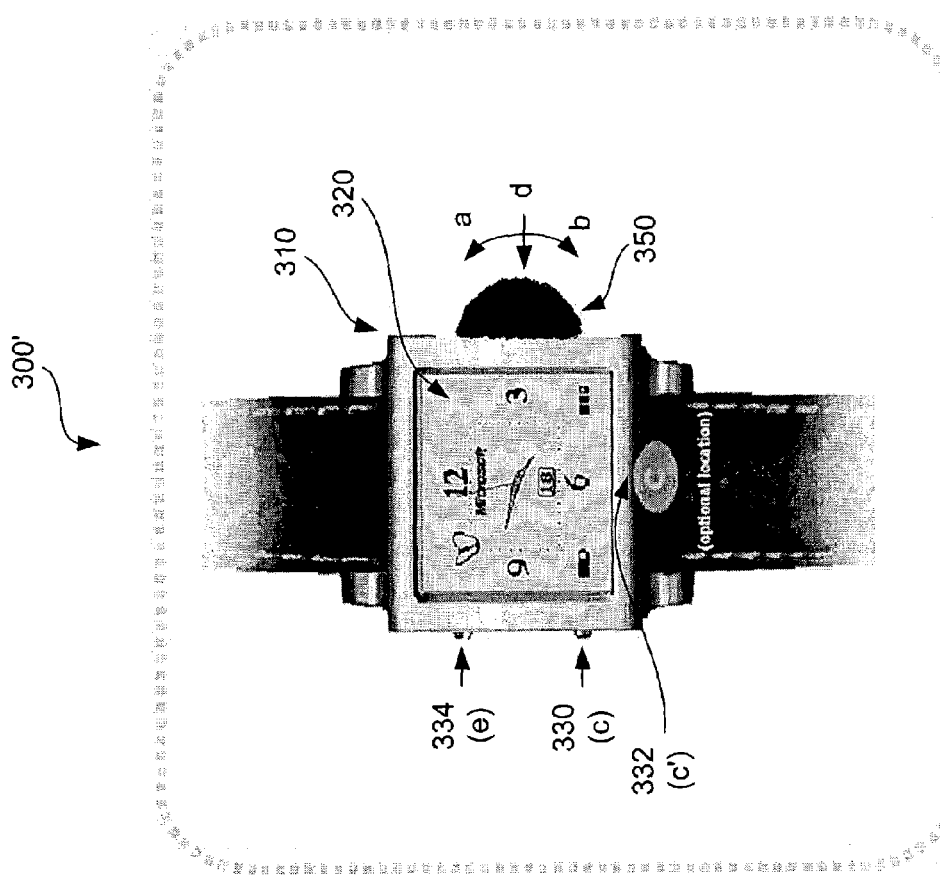

In one example of the present invention, electronic device 200 is a mobile electronic device such as a watch device that includes a wireless interface. Exemplary user interfaces for a watch device are shown in FIGS. 3A and 3B, as will be described below. Although the below-described user interface configurations include multiple selector buttons (e.g., four selector buttons), the functions of many of the selector buttons may be combined by a single selector (e.g., a button, a rocket switch, a wheel, etc.).

User Interfaces (UI)

FIG. 3A illustrates an exemplary watch device (300) that includes a user interface that is configured to take advantage of glanceable information technology. The watch device (300) includes a bezel (310), which has an electronic system (e.g., see FIG. 2). The electronic system performs the functions in a manner that is consistent with the hardware that was previously described with respect to FIG. 2. The bezel (310) has a display (320) such as a liquid crystal display, a multiple bit display, or a full color display. In one embodiment, watch hands are electronically generated on the display (320). In an alternative embodiment, the bezel includes analog-type watch hands that do not detrimentally interfere with the display (320). The watch device (300) includes a series of buttons (330) that are arranged to operate as a user interface (UI).

Each of the buttons operates as a selector in the user interface. Every button has a default function, and/or a context determined function. The currently selected channel determines the context for each selector. Alternatively, the currently active display may determine the context for each selector. For example, a display screen (e.g., a help screen) may be superimposed on the main display such that the display screen becomes the active context. The electronic device (300) is context sensitive in that the function that is associated with each selector may change based on the selected channel or display screen.

A first one of the selectors, button "a" (330) has a default function of page up or previous page in the currently selected channel. The first selector, button "a" (330), also has an alternate function based on currently selected channel or display. For example, when a help screen is displayed, the first selector may be configured to select a list display mode. In the list display mode, the electronic device will display a list of available messages or content that is associated with a particular channel. The time channel may include a main time screen, a chronograph screen, an alarm screen, and a timer screen. When the currently selected channel is the time channel, the first selector may be activated to set the time, start the chronograph, set the timer, or set the alarm on the electronic device. The setting of the time/timer/alarm is accomplished by activating the first selector for a predetermined time period. For example, when the selector is a button as shown in FIG. 3A, the button is held for a timeout interval such as two seconds before the setting function is activated.

A second one for the selectors, button "b" (330) has a default function of page down or next page in the currently selected channel. The second selector, button "b" (330), may also have an alternate function based on currently selected channel or display. In one example, the second selector is activated for a predetermined time interval (e.g., two seconds) to select "delete" function in a particular channel. In another example, the second selector is activated for a predetermined time interval to select a "list browse" function in a particular channel. In one example, activation of the second selector for two seconds selects the list browse function such that a pop-up visual cue (e.g., a pop-up window) indicates how that list is indexed. Each record set can be indexed by things such as dates, numbers, categories, or any other way of indexing a record set. The list browse indexing allows a user to quickly access records located within the list.

A third one of the selectors, button "c" (330) has a default function of next channel. The third selector, button "c" (330), may also have an alternate function based on the currently selected channel or display. In one example, the third selector is activated for a predetermined time interval (e.g., two seconds) to select the main channel or "primary" channel. The main channel in a watch device is the time screen, but may be a different screen in another device.

A fourth one of the selectors, button "d" (330) has a default (or "primary") function of "enter". The "enter" function is context sensitive and used to select the "enter" function within a selected channel, or to select an item from a selection list. The fourth selector, button "d" (330), may also have an alternate function based on the currently selected channel or display. For example, the fourth selector is activated for a predetermined time interval (e.g., two seconds) to activate a help screen or an additional set mode. In this example, the help screen remains active while the fourth selector is activated (e.g., maintaining button "d" as depressed), and the help screen is deactivated (e.g., removed from the display) when the fourth selector is deactivated (e.g., by releasing button "d").

The four selectors are arranged such that the electronic device accomplishes navigating and selecting content on each channel in a simple manner. An optional fifth selector (e.g., button "e", 334) may be arranged to provide other functions such as backlighting or another desired function. An optional sixth selector (e.g., button "f") may be arranged to operate as a "channel back" function such that navigation through channels may be accomplished in a forward and reverse direction.

In an alternative example, the third selector (e.g., button "c") may be located in the bottom center region of the watch bezel as illustrated by selector 332. In yet another example, the fourth selector (e.g., button "d") is located in the bottom center region of the watch bezel as illustrated by selector 332.

FIG. 3B illustrates another exemplary watch device (300') that includes a user interface to an electronic system that is configured to operate in accordance with the present invention. The watch device (300) is arranged in a substantially similar manner as that discussed with respect to FIG. 3A. However, the first, second, and third selectors (e.g., buttons "a", "b", and "d") are replaced with a wheel type of device (350). The functions of the "a" and "b" selectors are activated by rotating the wheel device (350) in a counterclockwise and clockwise manner. The functions of the "d" selector are activated by pressing the wheel device (350) towards the watch bezel.

In an alternative example, the "a" and "b" button-type selectors are replaced by a rocker-type of switch that may be depressed toward the locations of the "a" and "b" selectors illustrated in FIGS. 3A and 3B. In still another example, a touch screen interface is employed as the selectors for the watch device. Other examples of selector mechanisms may be employed.

The description that follows below includes examples of communication between broadcast towers and client devices such that client devices receive and store content. The communication method is for illustrative purposes only and is not required by every client device. Any client device that navigates stored content is considered within the scope of the described systems and methods.

Broadcast Channels

Figure 4:
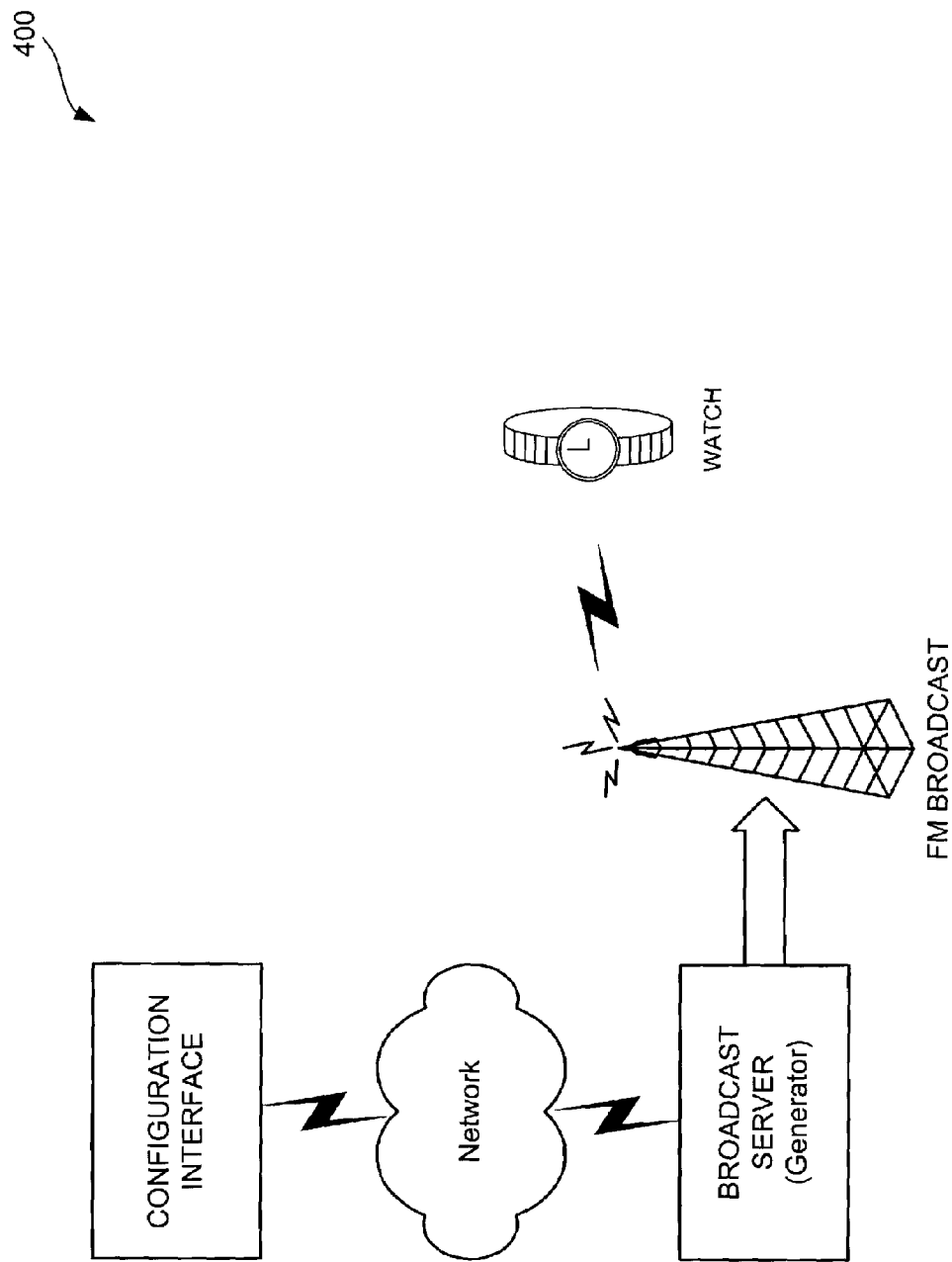
FIG. 4 is a block diagram of a broadcast system that includes a configuration interface.

Each broadcast transmitter tower is arranged to provide a communication signal that is configured for reception by electronic devices that are located within a service region. An exemplary FM broadcast tower transmits signal as directed by a broadcast server device as shown in FIG. 4. The broadcast server device (aka a "generator") may communicate with a configuration interface via a network communication link.

The configuration interface is configured as a means for selecting one or more services. In one example, a wireless client device user interacts with the scheduling interface to select services such as news, stock prices, weather, and other features such as a personal calendar, address book, and the like. Selected services are entered in a database for broadcast transmission at a later time. At the designated time (or time interval) the scheduling interface communicates with the broadcast server to begin a transmission sequence of data for the selected services. The broadcast server subsequently formats the data for reception by one or more wireless client device, queues the data for transmission, and communicates the queued data to the FM broadcast tower for transmission. In an alternative example, the scheduling interface communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region may receive shared messages, while a single client may decode a private message.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Process Flow

Figure 5A:
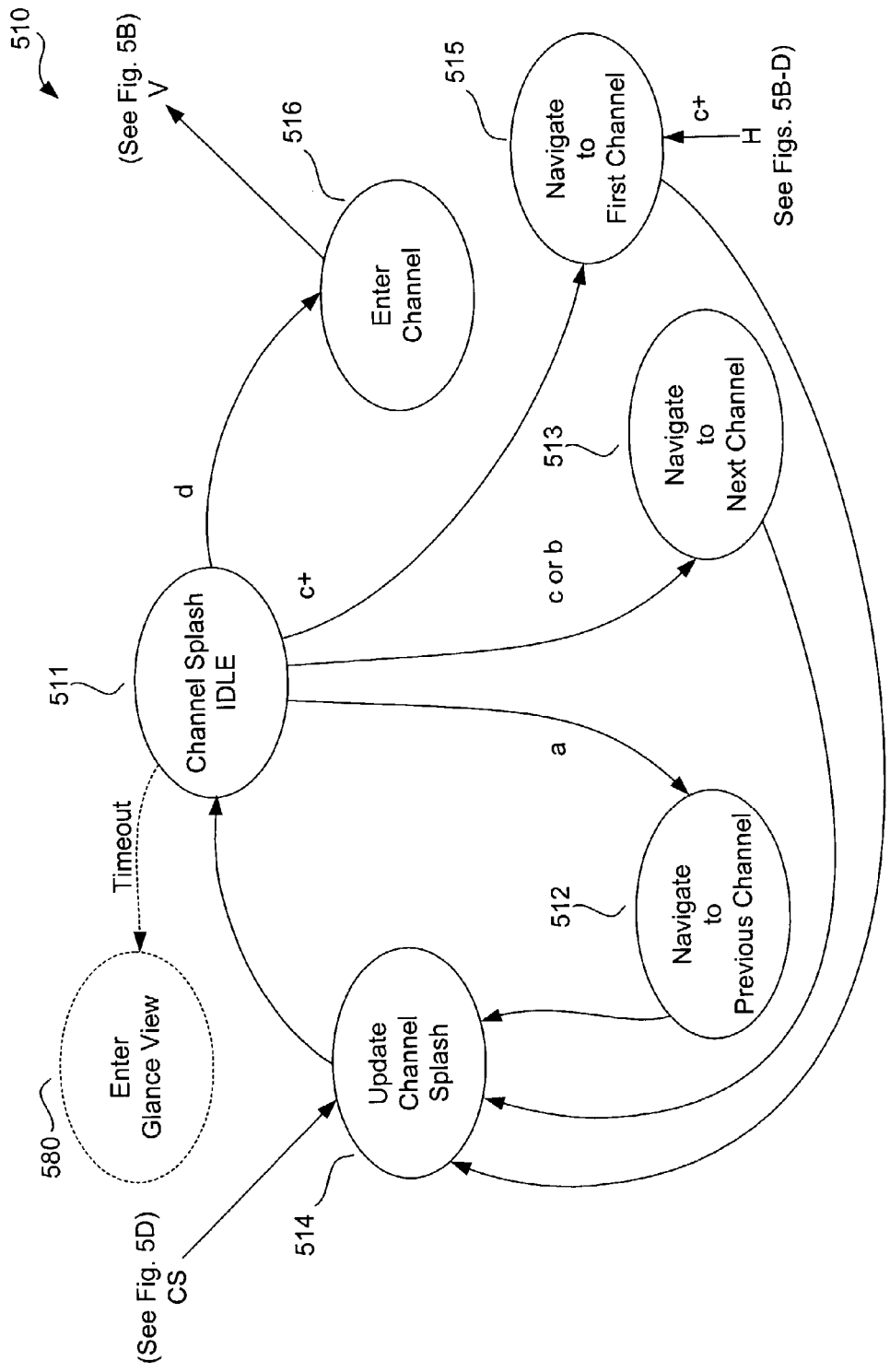
FIGS. 5A–5E are process flow diagrams for passive and active navigation functions of a electronic device.
Figure 5B:
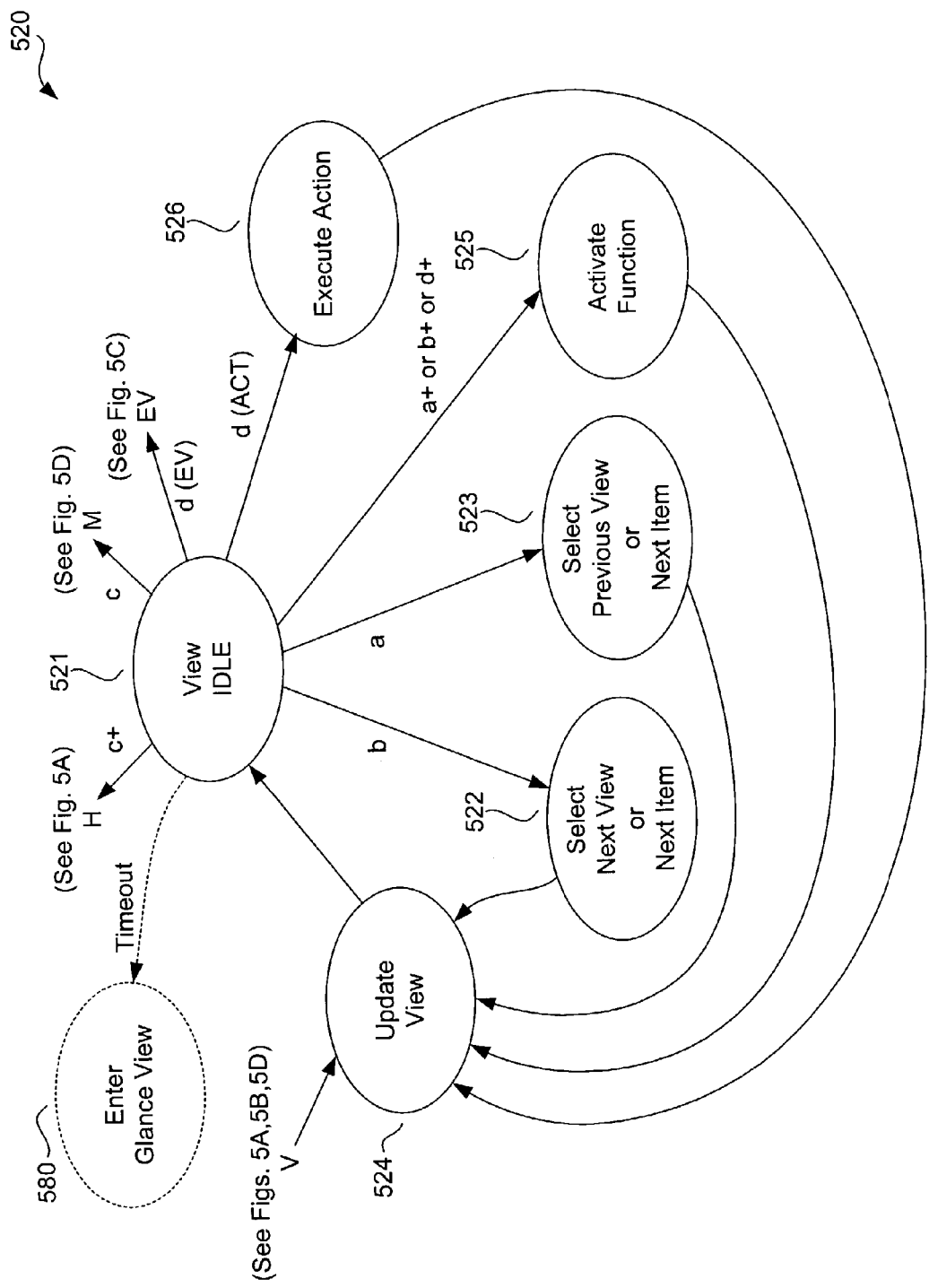
Figure 5C:
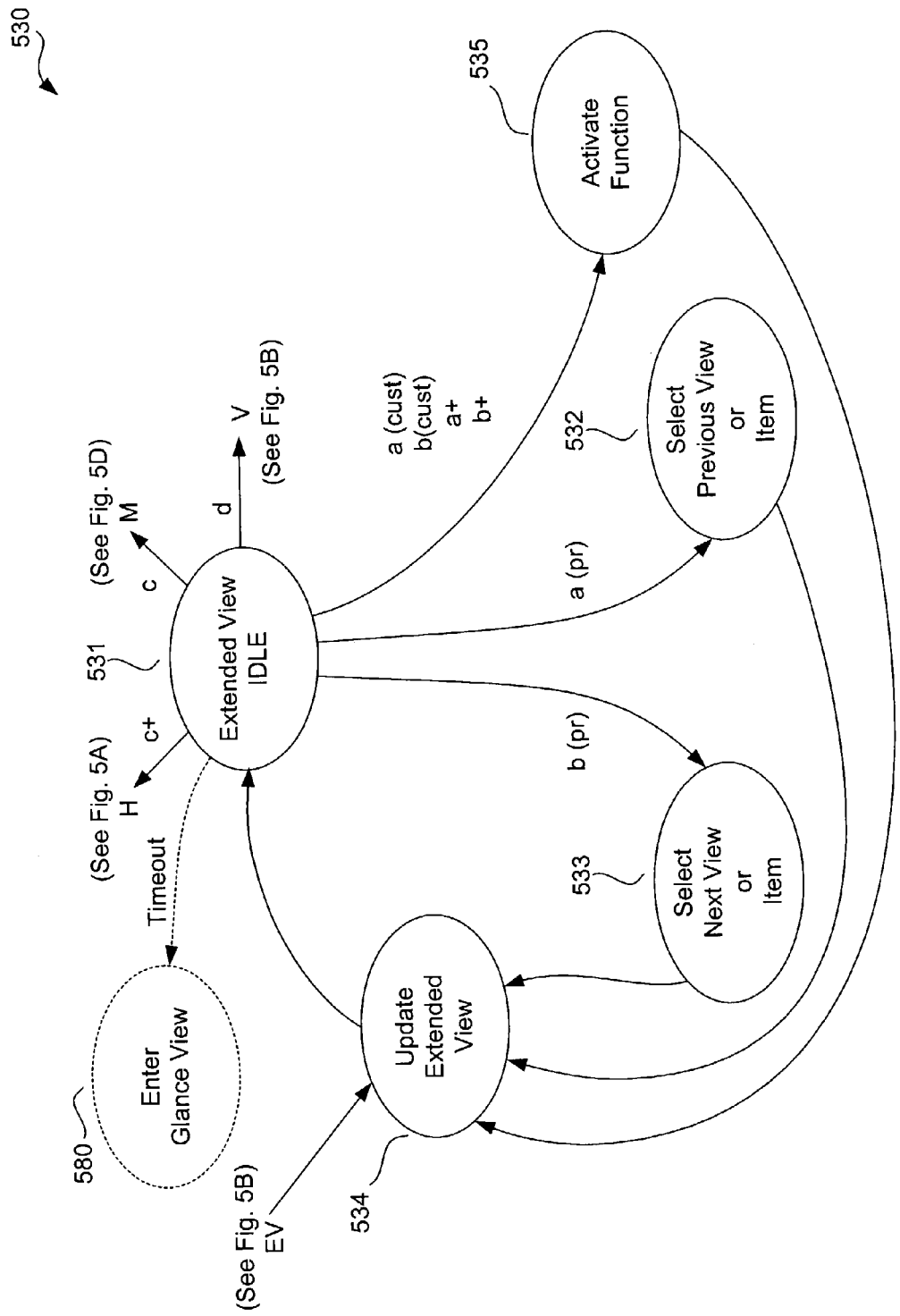
Figure 5D:
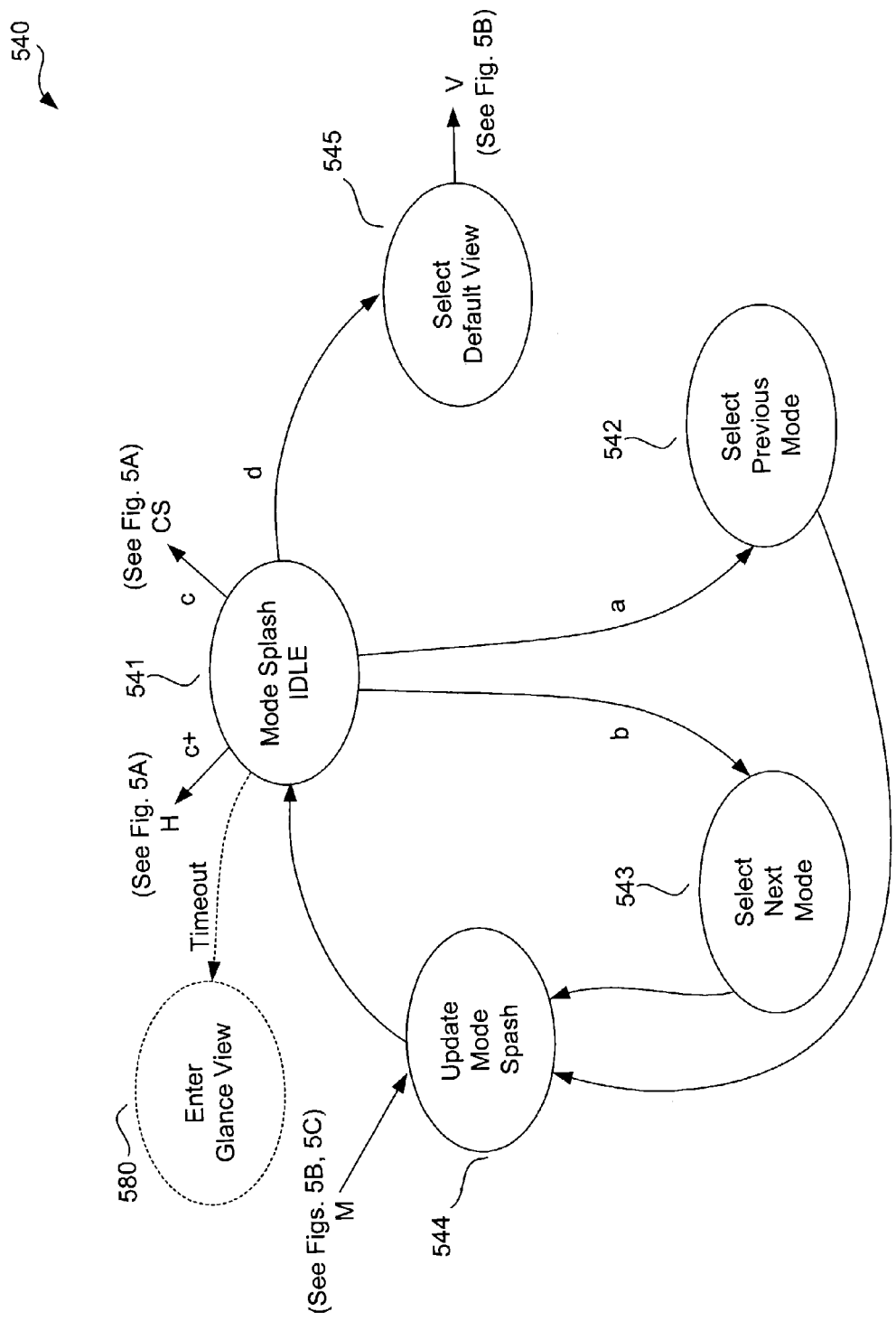
Figure 5E:
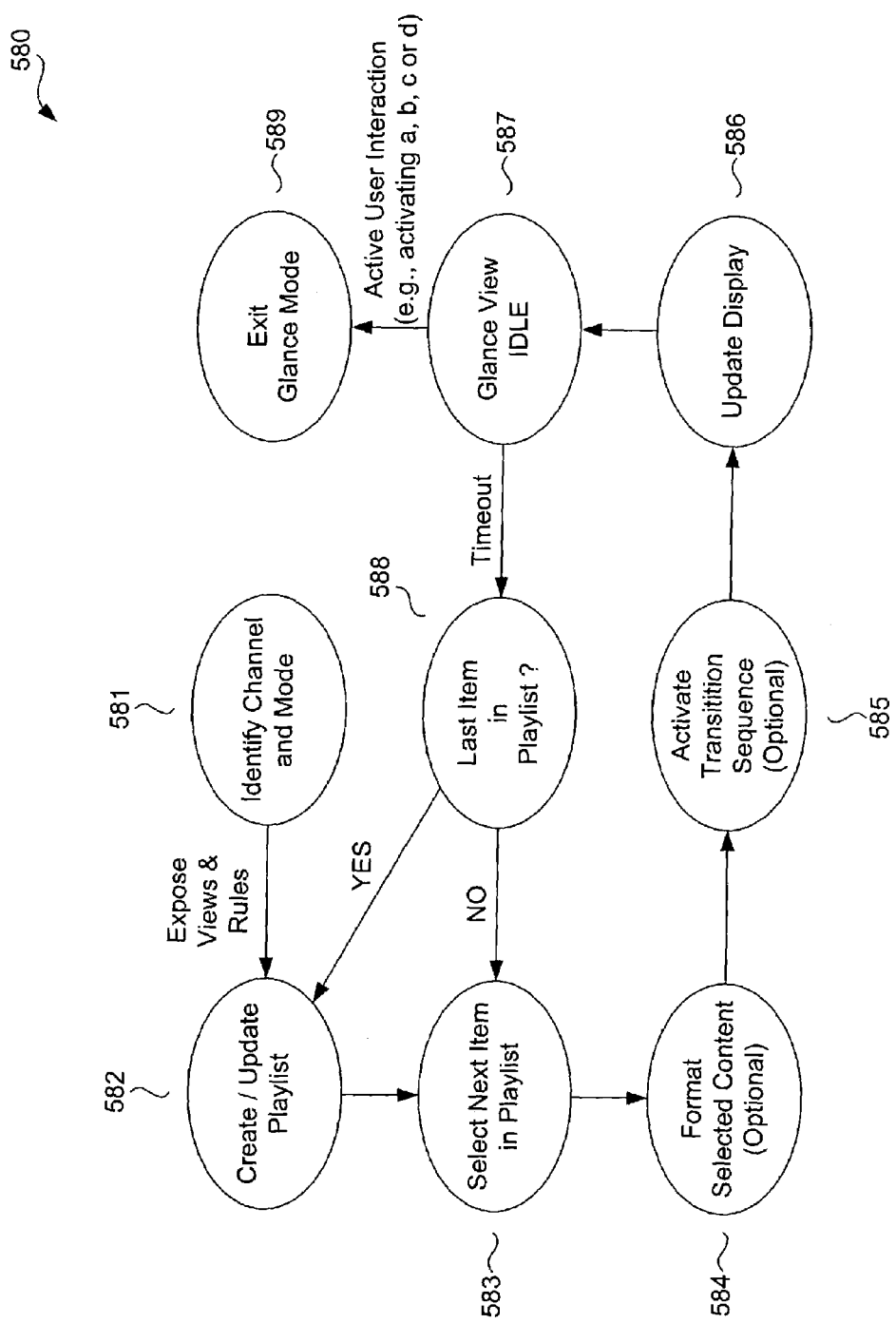

Process flow diagrams for navigation function of an example electronic device are illustrated in FIGS. 5A–5D. The process flow diagram illustrated in FIG. 5A is predominately focused on channel splash activity. The process flow diagram illustrated in FIG. 5B is predominately focused on view activity. The process flow diagram illustrated in FIG. 5C is predominately focused on extended view activity. The process flow diagram illustrated in FIG. 5D is predominately focused on mode splash activity. The process flow diagram illustrated in FIG. 5E is predominately focused on glance view activity.

Every electronic device has at least one channel that corresponds to the home channel. For a watch type of device, the home channel corresponds to a time channel. However, different home channels can be assigned to every electronic device. Whenever the currently selected channel corresponds to the home channel, the previous channel corresponds to the last channel (if more than one channel exists on the device). Similarly, the next channel corresponds to the home channel when the current channel is the last channel in the channel list for the electronic device.

Every electronic device has a set of selectors (or buttons) that are selectively activated to navigate various functions in the device. Example selectors are illustrated in FIGS. 3A–3B. For the purposes of the discussion below, each selector is indicated by a letter such as "a", "b", "c", "d", and "e". Some alternate selector functions may be chosen by sustained activation of a selector button for a predetermined time interval (e.g., two seconds). These alternate selector functions are generally indicated by a "+" symbol adjacent to the selector functions' designating letter (e.g., "c+").

Figure 7:
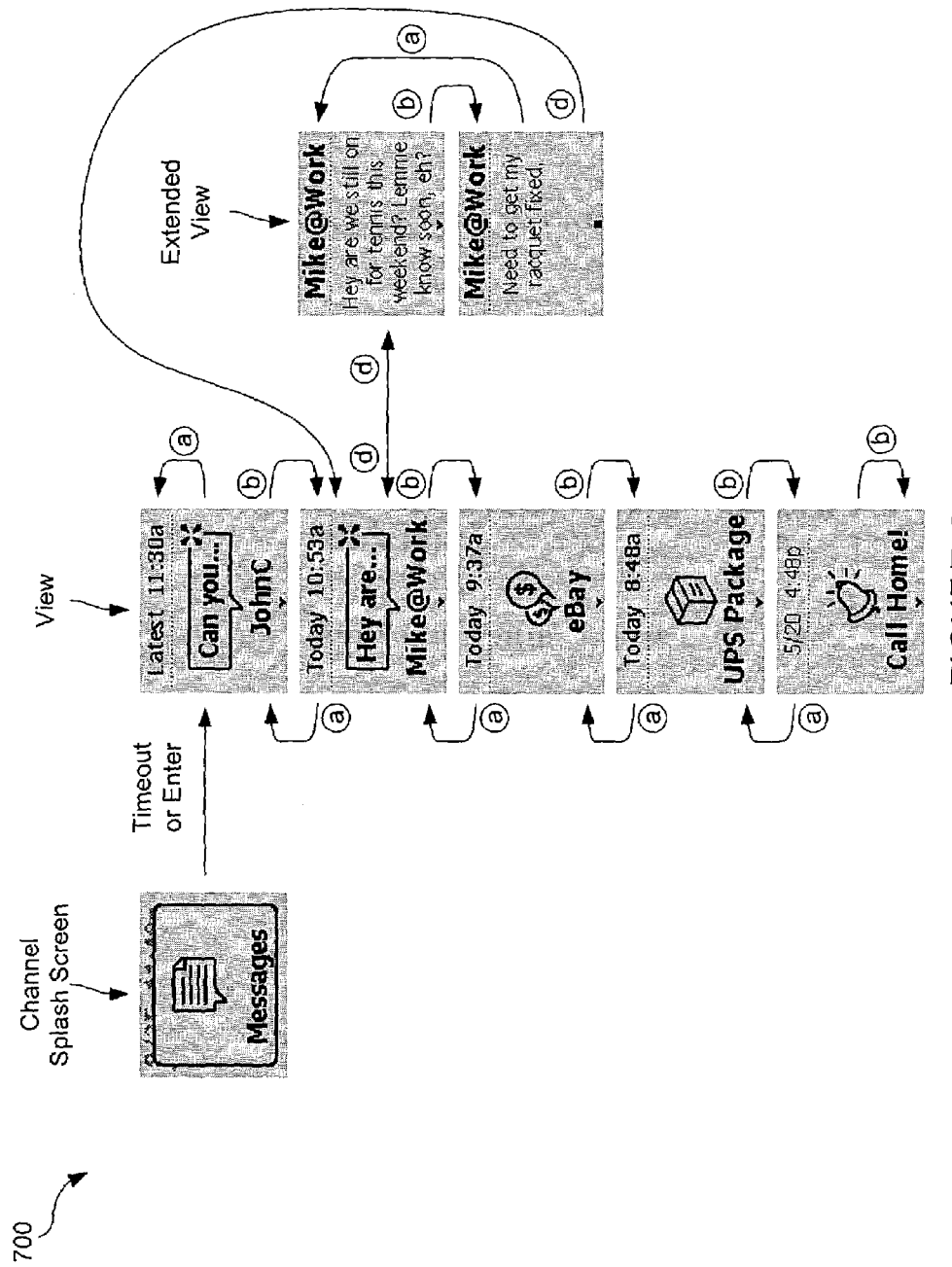
FIGS. 7–8 are diagrams illustrating channel interaction.

The example electronic device described below includes at least four selectors as indicated by letters "a", "b", "c", and "d". The "e" selector may be arranged to provide additional functions such as backlighting, a back channel selector, as well as any other desired function. Additional extended functions may also be accessible through multiple selector combinations. For example, holding the "d" and "a" selectors together ("d+" & "a+") for a predetermined time interval can be done to select special settings in the electronic device such as a "screen adjust" function. An example extended function is illustrated in FIG. 7. Additional extended functions can also be accomplished using other selector combinations such as "d+" & "b+", "a+" & "b+", as well as others.

Channel Splash Operating State

The channel splash operating state is described as follows below with reference to FIG. 5A.

The electronic device activates the channel splash operating state when the electronic device is initialized (e.g., just after a power-up sequence). The electronic device has a default initial channel that is referred to as a home channel. The display is updated to indicate the currently selected channel at block 514. Processing continues to block 611 where the channel splash operating state is maintained in an idle state. The electronic system in the electronic device monitors the user interface (e.g., the four selector) while in the channel splash IDLE state. When the user activates one or more of the selectors (e.g., one of four selectors), processing leaves the channel splash IDLE state.

Figure 8:
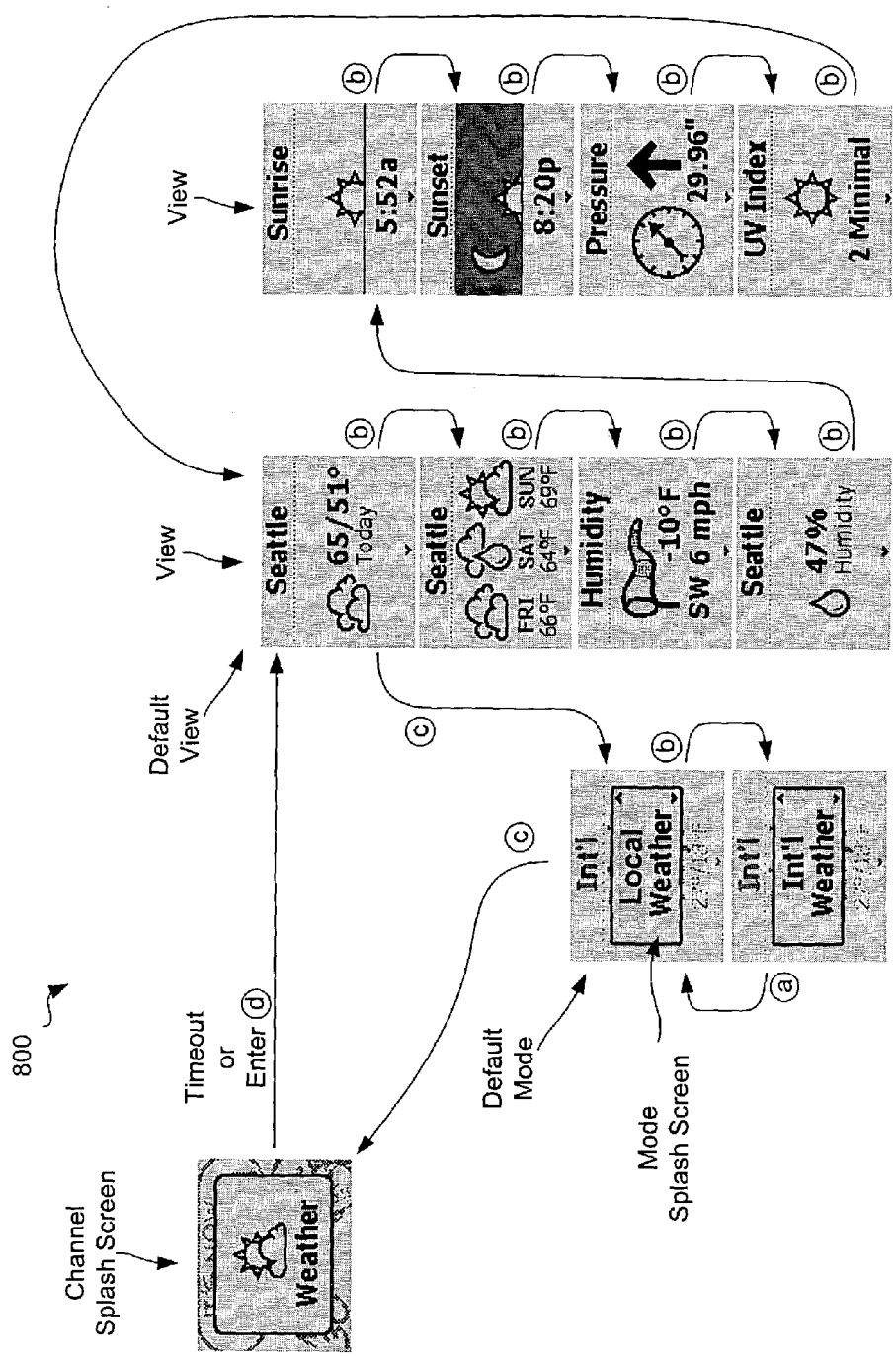

The display actively maintains the splash screen to indicate the current channel selection while the channel splash IDLE state is active at block 511. Splash screens may include one or more graphic elements and/or text elements. Example splash screens are illustrated in FIGS. 7 and 8. Splash screens may be accompanied by the activation of sound that provides an audible indicator that the channel has changed. The sound associated with the audible indicators may be the same for each channel splash screen, or unique based on either the particular channel or the particular channel type (e.g., news channels are one type, while messages are another type).

Processing flows from the channel splash IDLE state (511) to the "navigate up" or "navigate to previous channel" function (512) when the "a" selector is activated (e.g., depressing an "a" button). Processing continues from block 512 to block 514, where the display is updated based on the newly selected channel. After the display is updated, processing returns to the channel splash IDLE state (511).

Processing flows from the channel splash IDLE state (511) to the "navigate down" or "navigate to next channel" function (513) when either the "b" selector or the "c" selector is activated (e.g., depressing either the "b" or "c" button). Processing continues from block 513 to block 514, where the display is updated based on the newly selected channel. After the display is updated, processing again returns to the channel splash IDLE state (511).

Processing flows from the channel splash IDLE state (611) to the "navigate to first channel" or "navigate to home channel" function (515) when the "c+" selector is activated. The home channel navigation function can be accessed from any channel of the electronic device. The electronic device navigates to the home channel (e.g., the time channel on a watch device) when the "navigate to home channel" function is activated. Processing continues from block 513 to block 514, where the display is updated based on the newly selected channel (i.e., the home channel). After the display is updated, processing again returns to the channel splash IDLE state (511).

Processing flows from the channel splash IDLE state (511) to the "enter channel" function (516) when the "d" selector is activated (e.g., depressing a "d" button). Alternatively, the "enter channel" function is activated when the electronic system is maintained in the channel splash IDLE state for a predetermined time interval (e.g., 2 seconds) without activation of a selector. Processing flows from block 516 to block 524 (see FIG. 5B) when the "enter channel" function is activated as indicated by "V".

The enter channel function performs a series of initializations in the electronic device prior to leaving the channel splash operating state and entering the channel view operating state. Every channel in the electronic device has at least one operating mode. The electronic device selects the current operating mode as a default mode, and a current view as a default view in the currently selected channel when the "enter channel" function is activated.

In one example, a weather channel has a local weather operating mode, a national weather operating mode, and an international weather operating mode. A series of views is associated with each operating mode. For example, a local weather channel may have a view that includes content indicating the current temperature in Seattle, while a national weather channel may have a view that includes content indicating the temperatures across a region.

Processing flows from the channel splash IDLE state (511) to the "enter glance view" function (580) when the electronic system is maintained in the channel splash IDLE state for a predetermined time interval (e.g., 2 seconds) without activation of a selector. Glance view processing is described in more detail with respect to FIG. 5E.

Channel View Operating State

The channel view operating state is described as follows below with reference to FIG. 5B.

The electronic device enters the channel view operating state at entry point V, where the selector functions associated with the currently selected channel and operating mode are mapped to the selectors. The display is updated to indicate the currently selected view at block 524. Processing continues to block 521 where the channel view operating state is maintained in an IDLE state. The electronic system in the electronic device monitors the user interface (e.g., the four selector) while in the view IDLE state. When the user activates one or more of the four selectors, processing leaves the view IDLE state.

The display actively maintains the current view while the view IDLE state is active at block 521. List type views include lists of items that can be selected. Other types of views are simply graphical and/or textual elements that are arranged in a display view. Example views are illustrated in FIGS. 7 and 8. Views may be accompanied by the activation of sound that provides an audible indicator that the view has changed. The sound associated with the audible indicators may be the same for each view (e.g., a beep type of indicator or sound clip), or unique based on the particular view. In one example, an audible indicator is activated when a particular alert notification function is activated.

Processing flows from the view IDLE state (521) to the "previous view" or "previous item" function (522) when the "a" selector is activated (e.g., depressing an "a" button). Processing continues from block 522 to block 524, where the display is updated based on the newly selected view. After the display is updated, processing returns to the view IDLE state (521). In one example, the previous view corresponds to the last view when the currently selected view is the first available view in the current mode for the current channel. In another example, the previous view corresponds to a null when the currently selected view is the first available view in the current mode for the current channel. In still another example, the previous item in a list is highlighted when the "a" selector is activated.

Processing flows from the view IDLE state (521) to the "next view" or "next item" function (513) when the "b" selector is activated (e.g., depressing the "b" button). Processing continues from block 523 to block 524, where the display is updated based on the newly selected view. After the display is updated, processing again returns to the view IDLE state (521). In one example, the next view corresponds to the first view when the currently selected view is the last available view in the current mode for the current channel. In another example, the next view corresponds to a null when the currently selected view is the last available view in the current mode for the current channel. In still another example, the next item in a list is highlighted when the "b" selector is activated.

Processing flows from the view IDLE state (521) to the "mode splash" function when the "c" selector is activated as indicated by "M". Refer to FIG. 5D and related discussion for details.

Processing flows from the view IDLE state (521) to the select home channel splash function when the "c+" selector is activated as indicated by "H". Refer to FIG. 5A and related discussion for details.

The "d" selector is defined within the context of the current channel, mode, and view. The "d" selector may be defined as an "enter extended view" function, a "select" function, or a "execute action" function. Not every view in a given channel/mode has an extended view as may be indicated by a null value. Some views may have an action function that is defined within the context of the view in the currently selected mode/channel. The context for each view is assigned to the mode upon entry into the mode for the current channel.

Processing flows from the view IDLE state (521) to the "enter extended view" function when the "d" selector is activated (e.g., depressing a "d" button) and the extended view is available as indicated by "d(EV)". The extended view is available when defined within the context of the currently selected view. For example, the extended view may be available for a list type view such that the highlighted list item is selected when the "d" selector is activated, and a detailed view associated with the highlighted item is displayed as an extended view. Refer to FIG. 5C and related discussion for details on the extended view processing.

Processing flows from the view IDLE state (521) to the "execute action" function at block 526 when the "d" selector is activated and the action function is available as indicated by "d(ACT)". The action function is defined within the context of the currently selected view. For example, a fortune cookie mode may be available in an entertainment channel. Although the fortune cookie mode may only have a single view, the "d" selector may be mapped to an action function that randomly selects fortunes from a list when the "d" selector is activated. After the action is performed (e.g., retrieve random fortune from list, execute an animation sequence), processing continues to block 524 where the display is updated as previously described.

Other special functions may be mapped to the "a+", "b+", and "d+" selectors within the context of the current view. By activating the corresponding selector for a predetermined time interval (e.g., 2 seconds) the corresponding special function is activated as indicated by block 525. Processing continues from block 525 to block 524 where the display is updated as previously described.

In one example, a list browser function is available in a view that corresponds to a specific contact in an address book. For this example, activation of the "a" and "b" selectors manually navigates through other views that correspond to additional contacts in the address book, one at a time. Activation of the "a+" or "b+" selector may activate an index function that displays an index indicator such as "A", "B", "C", etc. After the index function is active, the "a" and "b" are mapped into scroll up and down functions, "c" is mapped to a cancel function, and "d" is mapped to a select current index function. Thus, a contact in the "Z" section of the address book can be accessed by selecting the "M" index without traversing through numerous contacts in the address book in sequence. The indexing system can be any alphanumeric type of indexing system as defined within the scope of the current view.

In another example, an erase function is available in a view that corresponds to a specific instant message in a messages channel. For this example, activation of the "a" and "b" selectors manually navigates through various messages one at a time. Activation of the "d+" selector may activate an erase function that removes the current instant message from the electronic device.

Processing flows from the view IDLE state (521) to the "enter view" function (580) when the electronic system is maintained in the channel splash IDLE state for a predetermined time interval (e.g., 2 seconds) without activation of a selector. Glance view processing is described in more detail with respect to FIG. 5E.

Extended View Operating State

The extended view operating state is described as follows below with reference to FIG. 5C.

The electronic device enters the extended view operating state at entry point EV, where the selector functions associated with the currently selected extended view are mapped to the selectors. The display is updated to indicate the currently selected extended view at block 534. Processing continues to block 531 where the extended view operating state is maintained in an IDLE state. The electronic system in the electronic device monitors the user interface (e.g., the four selector) while in the extended view IDLE state. When the user activates one or more of the four selectors, processing leaves the extended view IDLE state.

Figure 9:
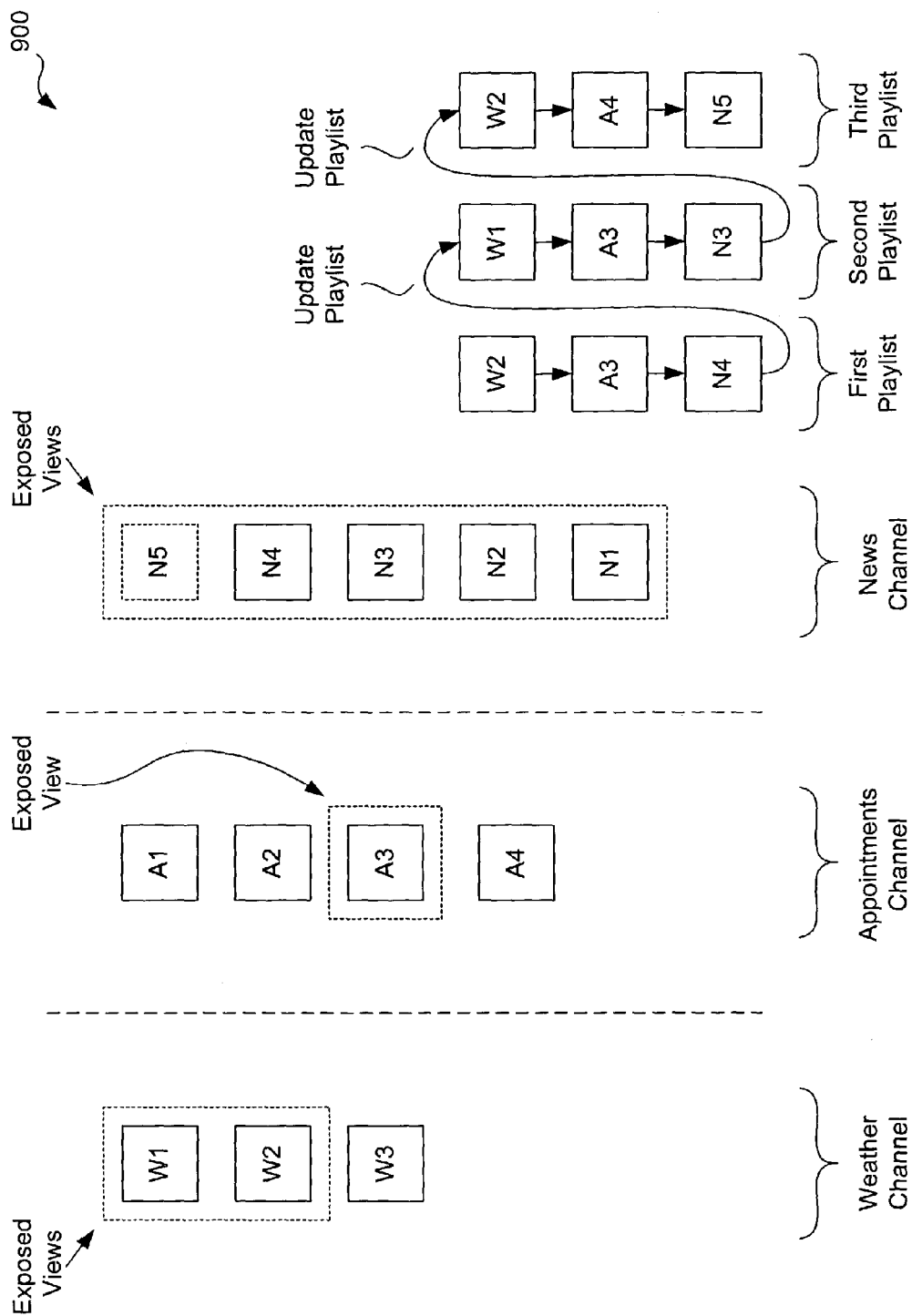
FIG. 9 is a diagram illustrating passive navigation features of an example electronic device.

The display actively maintains the current extended view while the extended view IDLE state is active at block 531. Extended views include graphical and/or textual elements that are arranged in a display view. Example extended views are illustrated in FIG. 9. Extended views may be accompanied by the activation of sound that provides an audible indicator that the extended view has changed. The sound associated with the audible indicators may be the same for each extended view (e.g., a beep type of indicator or sound clip), or unique based on the particular extended view.

Processing flows from the extended view IDLE state (531) to the "previous view" or "previous item" function (632) when the "a" selector is activated (e.g., depressing an "a" button). Processing continues from block 532 to block 534, where the display is updated based on the newly selected extended view. After the display is updated, processing returns to the extended view IDLE state (531). In one example, the previous view corresponds to the last extended view when the currently selected extended view is the first available extended view for the current channel/mode. In another example, the previous extended view corresponds to a null when the currently selected extended view is the first available extended view in the current channel/mode.

Processing flows from the extended view IDLE state (531) to the "next view" or "next item" function (533) when the "b" selector is activated (e.g., depressing an "b" button). Processing continues from block 533 to block 534, where the display is updated based on the newly selected extended view. After the display is updated, processing returns to the extended view IDLE state (531). In one example, the next view corresponds to the first extended view when the currently selected extended view is the last available extended view for the current channel/mode. In another example, the next extended view corresponds to a null when the currently selected extended view is the last available extended view in the current channel/mode.

Processing flows from the extended view IDLE state (531) to the "mode splash" function when the "c" selector is activated as indicated by "M". Refer to FIG. 5D and related discussion for details.

Processing flows from the extended view IDLE state (531) to the view function when the "d" selector is activated as indicated by "V". Refer to FIG. 5B and related discussion for details.

Processing flows from the extended view IDLE state (531) to the select home channel splash function when the "c+" selector is activated as indicated by "H". Refer to FIG. 5A and related discussion for details.

Special functions may be mapped to the "a'", "b'", "a+" , and "b+" selectors within the context of the current view. By activating the corresponding selector for a predetermined time interval (e.g., 2 seconds) the corresponding special function is activated as indicated by block 535. Processing continues from block 635 to block 534 where the display is updated as previously described.

Processing flows from the extended view IDLE state (531) to the "enter glance view" function (580) when the electronic system is maintained in the extended view IDLE state for a predetermined time interval (e.g., 10 seconds) without activation of a selector. Glance view processing is described in more detail with respect to FIG. 5E.

Mode Splash Operating State

The model splash operating state is described as follows below with reference to FIG. 5D.

The electronic device enters the mode splash operating state at entry point M. The display is updated to indicate the currently selected mode at block 545. Processing continues to block 541 where the mode splash operating state is maintained in an IDLE state. The electronic system in the electronic device monitors the user interface (e.g., the four selector) while in the mode splash IDLE state. When the user activates one or more of the four selectors, processing leaves the mode splash IDLE state.

Figure 10:
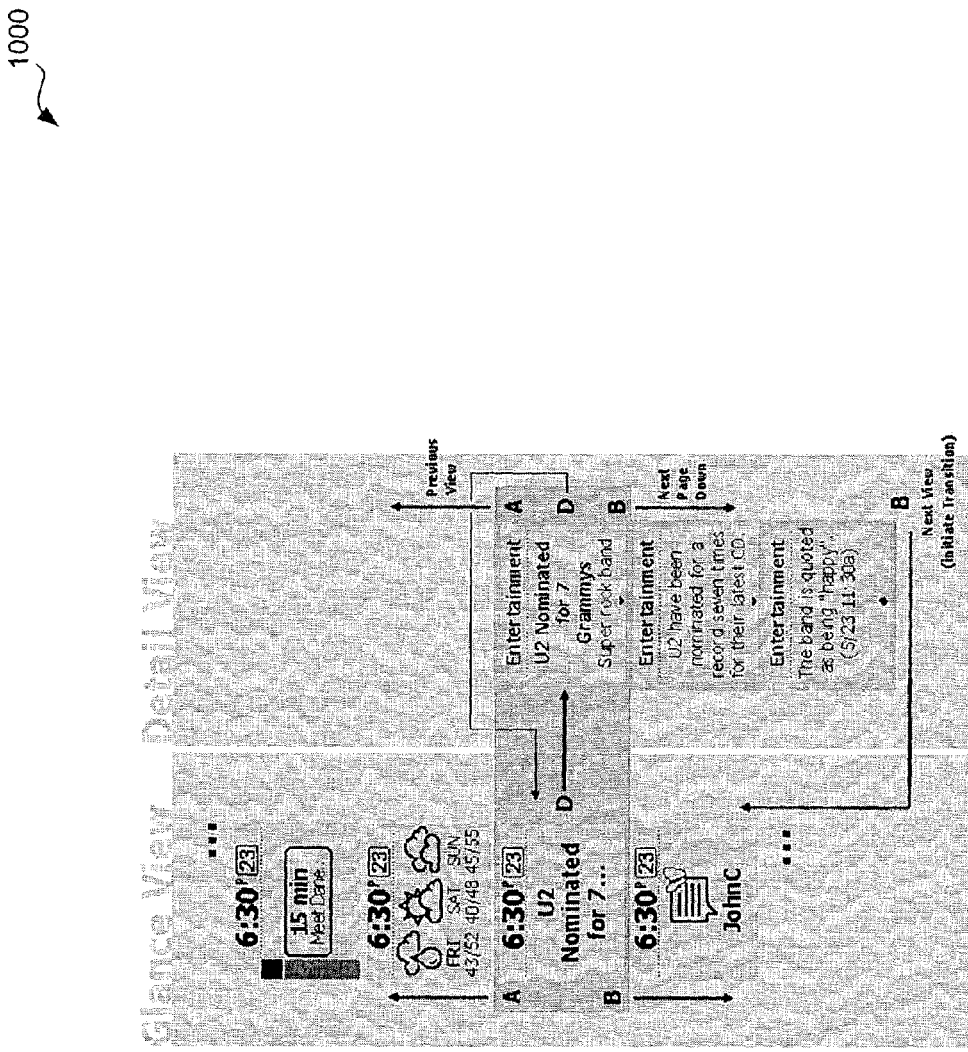
FIG. 10 is a diagram illustrating a customized channel that is operated in glance view.

The display actively maintains the current mode splash display while the mode splash view IDLE state is active at block 541. Mode splash views include graphical and/or textual elements that are arranged in a display view. Example mode splash displays are illustrated in FIG. 10. Mode splash displays may be accompanied by the activation of sound that provides an audible indicator that the selected mode has changed. The sound associated with the audible indicators may be the same for each mode splash (e.g., a beep type of indicator or sound clip), or unique based on the particular mode selected.

Processing flows from the mode splash IDLE state (541) to the "previous mode" function (542) when the "a" selector is activated (e.g., depressing an "a" button). Processing continues from block 542 to block 544, where the display is updated based on the newly selected mode. After the display is updated, processing returns to the mode splash IDLE state (541). In one example, the previous mode corresponds to the last mode when the currently selected mode is the first available mode for the current channel.

Processing flows from the mode splash IDLE state (541) to the "next mode" function (543) when the "b" selector is activated (e.g., depressing an "b" button). Processing continues from block 543 to block 544, where the display is updated based on the newly selected mode. After the display is updated, processing returns to the mode splash IDLE state (541). In one example, the next mode corresponds to the first mode when the currently selected mode is the last available mode for the current channel.

Processing flows from the mode splash IDLE state (541) to the "channel splash" function when the "c" selector is activated as indicated by "CS". Refer to FIG. 5A and related discussion for details.

Processing flows from the mode splash IDLE state (541) to the "select default view" function (545) when the "d" selector is activated. Processing continues from block 545 to the channel view operating state as indicated by "V". Refer to FIG. 5B and related discussion for details.

Processing flows from the mode splash IDLE state (541) to the select home channel splash function when the "c+" selector is activated as indicated by "H". Refer to FIG. 5A and related discussion for details.

Processing flows from the mode splash IDLE state (541) to the "enter glance view" function (580) when the electronic system is maintained in the mode splash IDLE state for a predetermined time interval (e.g., 2 seconds) without activation of a selector. Glance view processing is described in more detail with respect to FIG. 5E.

Glance-View Operating State

A process flow diagram (580) for passive navigation functions of an exemplary electronic device is illustrated in FIG. 5E. During passive navigation, the user interface is operated without any active interaction from the user. The user interface for the electronic device (e.g., the video display on a watch-based device) will have a series of visual cues that are periodically changed under various timing conditions and according to rules based decisions. In another example, the user interface includes an audio interface (e.g., a speaker) that provides audible cues. The cues are based on the content from channels in the electronic device, and are arranged in an abbreviated format for glanceable viewing. Passive interaction is accomplished using visual cues (and optionally audible cues) in the "glance-view operating state".

The electronic device has an active channel at all times. The glance-view operating state is entered at block 580 when the electronic device is idle, or "parked", on any channel for a predetermined time interval (e.g., 5 seconds). Processing begins at block 581, where the electronic device identifies the currently active channel and mode. After the channel and mode are identified, views and rules associated with the current channel and mode are exposed, and processing continues to block 582.

At block 582, the electronic device creates a playlist of all of the exposed views that are available within the channel and mode. The playlist corresponds to a list of available content views that are associated with the parked channel. The playlist is context sensitive so that the first item on the playlist corresponds to the next available view for the channel and mode. In one example, the electronic device is configured to store content associated with a weather channel, where the weather channel has two modes (local weather and national weather). For this example, the playlist may include views for current humidity, current temperature, and five day forecast when the electronic is parked on the local weather mode of the weather channel.

Each channel may have views available that participate in the glance-view operating state. However, each channel can be configured differently such that some channels may not have any views exposed to the glance-view mode. Each glanceable view that is available for the electronic device may be included in the playlist. However, not every channel view may be available for glance viewing in the glance mode. Moreover, the availability of views may change based on the rule-set that is associated with the current channel and mode. The rules associated with a channel and mode designate the behavior of various views within the context of the current channel, as well as any glance view behavior. For example, a messages channel may have a rule-set that only permits viewing of unread messages in the glance view operating state. Although unread messages may be available for display in the glance mode, messages that have been viewed may not be available. In another example, an appointments channel may have a rule that only permits viewing upcoming appointments, while past appointments and distant future appointments may not be available.

Processing continues from block 582 to block 583, where the next item in the playlist is selected. The playlist is similar to a queue (or linked list, etc) with an index (or reference pointer, etc.). The current selection from the playlist corresponds to the current index (or pointer, etc.). The next item is selected by advancing the index or pointer to the next item in the playlist. When the last item in the playlist is selected, the next item corresponds to a first item in the playlist, or another playlist that corresponds to an updated playlist. In one example, the next item in the playlist correspond to the first item in the playlist when the playlist is first created so that the current view (which has already been available for viewing) is skipped when the glance mode is first activated.

Processing flows from block 583 to block 584, where the content that is associated with the currently selected item in the playlist is optionally formatted for the glanceable view. The glanceable view corresponds to an abbreviated view of the content that is associated with the particular channel. The abbreviated view is akin to a headline for a particular view. For example, when the current channel corresponds to unread messages, the glanceable view may include the name of the message originator, the date of the message, and the first portion of the message. The amount of content that is viewable in the glance mode will depend on the various display requirements (e.g., display resolution, selected font, etc.).

Block 584 is optional. The content that is provided to the electronic device may be preformatted so that the formatting step is unnecessary. In one example, meta-data is provided for every particular content that is provided in a channel. The meta-data associated with the particular content is configured for glanceable viewing.

Continuing from block 584 to block 585, an optional transition sequence is activated. The transition sequence may correspond to any desired visual graphic effect to indicate a transition between the last selected view and the next selected view. One example visual graphic effect corresponds to a fade-out of the last selected view and a fade-in of the next selected view. Another example visual graphic effect corresponds to a splash screen. Still another example visual graphic effect corresponds to a screen wipe, which will be described in further detail with respect to FIG. 13. In another example, an audible effect is provided to indicate a change in the current view. Any combination of audible and visual cues may be employed as a transition sequence. Alternatively, the transition sequence may be eliminated or disabled.

Flowing from block 585 to block 586, the graphical display screen is updated such that the newly selected item from the playlist is now viewable as glanceable information. Processing continues from block 586 to block 587, where the electronic device enters an IDLE state (glance-view IDLE). The electronic device will leave the IDLE state when a timeout condition is satisfied such as when the glance-view has been IDLE for five seconds. Processing flows from block 587 to block 588 where the playlist is analyzed. Processing continues from block 588 to block 583 when additional items are available for processing in the playlist. Processing continues from block 588 to block 582 when all items in the playlist have been processed. At block 582, a new or updated playlist is created to reflect changes in available content based on the exposed rule set for the current channel and mode.

Processing continues from block 587 to block 589 where the glance mode is exited when any one of the user-interface selectors is activated. When the glance mode is exited, the electronic device will return to the processing flow diagrams that are illustrated in FIGS. 5A–5D. For example, depressing the "d" selector will enter a detailed view of the currently selected channel view, while depressing the "c+" selector will navigate to the home channel. The glance mode is inactive whenever the electronic device is operated with active interaction (e.g., active operation of the selectors by a user). The glance mode may be reactivated after the electronic device is idle for the timeout period.

Example Channel Navigation

Figure 6:
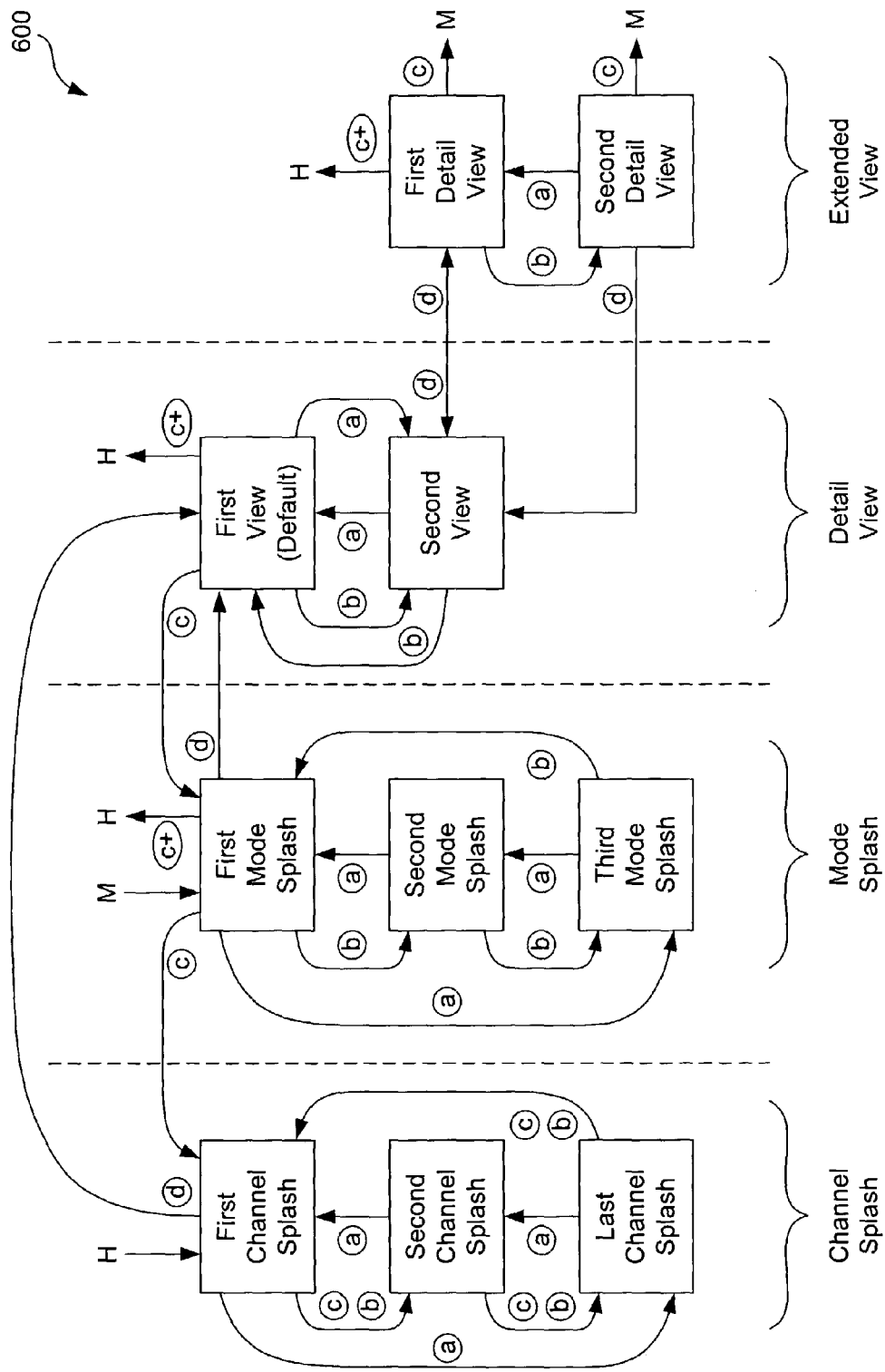
FIG. 6 is a diagram that illustrates navigation functions for an electronic device.

FIG. 6 is a diagram that illustrates navigation functions for an example electronic device. Each channel has a corresponding channel splash screen, and at least one mode. Each mode includes display views. As shown in the figures, the first channel includes a channel splash, and three modes. Also shown in the drawing, two views are available for the first mode, and two extended views are available for the second view.

Although three channels are illustrated in FIG. 6, the electronic device may be arranged to select and display any number of channels. Although every channel has at least one mode, modes for the second and third channels are not shown in the drawing.

Example navigation functions are illustrated in FIG. 6 according to the "a", "b", "c", and "d" selectors as previously described. Additional navigation functions may also be included in addition to those shown in the figure.

Navigation through the channels is accomplished by activation of the "c" selector when the channel splash is active. For example, a user can navigate from the first channel to the second, and third (last) channels by repeatedly activating the "c" selector. Alternatively, the user can navigate through the channels by activation of the "a" and "b" selectors while the channel splash is active. Activating the "c" or "b" selector on the last channel navigates the user back to the first channel. Activating the "a" selector on the first channel navigates the user to the last channel.

Entering a selected channel is accomplished by activation of the "d" selector or by a timeout without any interaction. For example, a user can navigate from the first channel splash, to the first (default) view in the first (default) mode by activating the "d" selector. After the channel is entered, navigation through the various views is accomplished by the "a" and "b" selectors, as shown. Activating the "c" selector in any of the views will navigate the user back to a mode splash screen. Activation of the "c+" selector from any view will navigate the user back to the first (home) channel, and display the mode splash screen again.

Entering an extended view is accomplished by activation of the "d" selector in a view that has an extended view available. For example, the first view illustrated in FIG. 6 does not have any extended views, while the second view has two extended views available. Activation of "d" in the first view results in no change, while activation of "d" in the second view enters the extended view mode. From the extended view mode, navigation through the extended views is accomplished by the "a" and "b" selectors, as shown. Activating the "d" selector in any of the extended views will navigate the user back to the view display. Activation of the "c" selector in any of the extended views will once again activate the mode selection splash screen. Also, activation of the "c+" selector from any extended view will navigate the user back to the first (home) channel.

FIG. 7 is a diagram illustrating displays for a view that is a list type. The view is entered by any navigation means as previously described such as from the channel splash screen by activating the "d" selector. The view in the channel shown in FIG. 9 is a customized view that does not employ the typical navigation assignments to the "a" and "b" selectors. Since the "a" and "b" selectors have been overridden, designators such as icon symbols are located adjacent to the respective selector. Each icon is determined by the assignment of the corresponding selector to a function. Example navigation icons that are shown in FIG. 7 include: list select, page up, browse up, on/off, page down, browse down, next/select, and next channel.

The view illustrated in FIG. 7 includes designators for list select, next message, page/(delete), and next channel. Activation of the "a" selector will select the list select function such that a list of available details is displayed on the screen (list view). A selected one of the items in the list view is selected by activating the "d" selector, resulting in an extended view. Once the extended view is selected (e.g., content item c), other extended views from the list can be selected by paging up or down within the selected view with the "a" and "b" selectors.

Channels may be categorized as single-mode and multi-mode. An example single-mode channel is a messages channel, as will be described with respect to FIG. 7. An example multi-mode channel is a weather channel, as will be described with respect to FIG. 8. An example "customized" channel is described with respect to FIG. 10.

Example Single-Mode Channel Interaction

An example single-mode channel interaction that is in accordance with the present invention is illustrated in FIG. 7. Single mode channels are arranged to provide glanceable information according to the exposed rule set when the glance mode is activated. Single mode channels can be automatically navigated when the glance mode is active, or manually navigated when the glance mode is paused (or suspended).

As illustrated in the FIG. 7, a channel splash screen is displayed when the channel is initially selected. After the channel is selected, the glance mode is activated by the expiration of a timeout period (e.g., ten seconds) without user interaction. Any active user interaction will pause the glance mode. The channel will again activate the glance mode after the expiration of a timeout period without user interaction.

An example of active navigation in the channel is accomplished with user interaction of various selectors such as "a", "b", and "d", as illustrated in FIGS. 5A–5D. Activation of the "d" selector (or enter function) will select the detail views that correspond to the particular glanceable view that is active. Activation of the "d" selector will again select the glanceable view when the last detail view is active.

After the splash screen is dismissed (either through active interaction or through the expiration of a timeout period), the first glanceable message is displayed on the electronic device. Each channel includes a series of main views that are formatted such that they are glanceable. In the messages channel, the main views may include email messages, instant messages, online auction notices (e.g., ebay), package delivery tracking (e.g., UPS), and other alerts.

Each glanceable view for the selected channel will be automatically selected according to a playlist as previously described. The electronic device will automatically display the various channel views according to the playlist while the glance mode is active. The current channel view may be manually advanced by pausing the glance mode with the activation of the next and previous selectors (e.g., "a" and "b" selectors). One or more extended views that are associated with the current channel view can be displayed by activating the enter function (e.g., the "d" selector). Activation of the enter function from the last extended view cycles the display back to the channel view associated with the extended views.

FIG. 7 is an illustration (700) of various screens for channel navigation functions for a messages channel. A channel splash screen is displayed when the messages channel is initially selected, as previously described. After the splash screen is dismissed (either through the expiration of a timeout interval or by through user interaction) a default view (e.g., most recent message) for the messages channel is displayed.

The messages channel may include a number of views that each corresponds to a different message. The example illustrated in FIG. 7 includes a text message (e.g., from John C), another text message (e.g., from Mike@Work), a message concerning an auction (e.g., from ebay), a notification from a courier (e.g., UPS), and an alert message (e.g., call home). Navigation between views in the current channel (in this example, the messages channel) is accomplished by activation of the "a" and "b" selectors as previously described. Some messages may include further details in an extended view that can be accessed by activating the "d" selector. Example extended views for one of the messages (e.g., from Mike@Work) are illustrated in FIG. 7. Navigation through the extended views is accomplished by activation of the "a" and "b" selectors, as previously described. Activation of the "d" selector from any of the extended views navigates back to the view display. Activation of "b" selector on the last view, or "a" on the first view, does not cycle to another view, as illustrated in FIG. 7.

Example Multi-Mode Channel Interaction

An example multi-mode channel interaction that is in accordance with the present invention is illustrated in FIG. 8. Multi-mode channels are arranged to provide glanceable information according to the exposed rule set when the glance mode is activated. Multi-mode channels can be automatically navigated when the glance mode is active, or manually navigated when the glance mode is paused (or suspended).

As illustrated in the FIG. 8, a channel splash screen is displayed when the channel is initially selected. After the channel is selected, the glance mode is activated by the expiration of a timeout period (e.g., thirty seconds) without user interaction. Any active user interaction will pause the glance mode. The channel will again activate the glance mode after the expiration of a timeout period without user interaction.

An example of active navigation in the channel is accomplished with user interaction of various selectors such as "a", "b", and "d", as illustrated in FIGS. 5A–5D. Activation of the "d" selector (or enter function) will select the detail views that correspond to the particular glanceable view that is active. Activation of the "d" selector will again select the glanceable view when the last detail view is active. Each mode in a multi-mode channel is accessed via the main view screen (also referred to as the glance ambient view) via activation of the "a" and "b" selectors.

A mode splash screen is displayed when the mode is changed. The mode splash screen may be dismissed via a timeout condition or by activation of the "d" selector (or enter function). Each mode has a series of associated glanceable views. Each glanceable view for the selected mode will be automatically selected according to a playlist as previously described.

FIG. 8 is an illustration (800) of various screens for channel navigation functions for a weather channel. A channel splash screen is displayed when the weather channel is initially selected, as previously described. After the splash screen is dismissed (either through the expiration of a timeout interval or by through user interaction with the "d" selector) a default view for the weather channel is displayed (e.g., current temp in Seattle).

The weather channel may include a number of modes depending upon the configuration of the channel. The example illustrated in FIG. 8 includes a local weather mode, and an international weather mode. Navigation between modes in the current channel (in this example the weather channel) is accomplished by activation of the "a" and "b" selectors after enabling the mode splash as previously described. Channel views for the current mode are accessed by activating the "a" and "b" selectors once the channel view is accessed (e.g., after selecting the channel, or mode). Example views for a weather channel may include: current temperature, multi-day forecast, wind, humidity, time for sunrise, time for sunset, barometric pressure, and UV index. Navigation through the views is accomplished by activation of the "a" or "b" selectors, as previously described. Activation of "b" selector on the last view cycles the view back to the first view, as illustrated in FIG. 8.

The weather channel may be configured to have more than one mode, where each mode corresponds to a particular weather channel (e.g., local weather, national weather, international weather, etc.). Each mode has a special splash screen to give a visual (and optionally an audible) cue that indicates a change in the current mode. For example, a "National Weather" splash screen may be activated when the main view navigates to the national weather mode for the weather channel. After the splash screen is dismissed (e.g., a timeout or a user interaction dismisses the splash screen), one of the detail views for the national weather is immediately displayed. Alternatively, the splash screen is dismissed by depressing either the "c−" selector or the "c+" selector, navigating back to the channel selection splash screens as previously described.

Example Passive Navigation

FIG. 9 is a diagram illustrating passive navigation features of an example electronic device.

As described previously, each channel has one or more modes with a number of associated views. However, not every view is necessarily exposed during the glance view operating state.

An example weather channel may have three channel views that are available in active interaction, while not all views may be available for passive interaction in the glance view operating state. Example channel views include current temperature, extended forecast, and current humidity (e.g., see FIG. 8). The channel view that is exposed to the glance view operating state is determined according to the rule set associated with the weather channel for the current mode. For example, the rule set for an example weather channel in a local weather mode may designate that a number of views associated with local weather are exposed. As shown in FIG. 9, two of the channel views (W1, W2) out of three available views (W1–W3) are exposed to the glance view operating state for passive interaction.

Passive user interaction for the example weather channel illustrated in FIG. 9 can be activated by parking the electronic device on the weather channel. For this example, the electronic device will create a playlist that includes views W1 and W2. Content associated with the views that are available in the playlist may be updated while the electronic device is parked on the channel. For example, the temperature associated with a local temperature view is periodically updated when more information is available. After a cycle through the playlist (W1, W2) is completed, the playlist may be updated to reflect more information that is received for other exposed views.

An example appointments channel may have four channel views that are available in active interaction, while not all views may be available for passive interaction in the glance view operating state. As shown in FIG. 9, one of the channel views (A3) out of four available views (A1–A4) is exposed to the glance view operating state for passive interaction. The channel view that is exposed to the glance view operating state is determined according to the rule set associated with the appointments channel for the current mode. For example, the rule set for an upcoming appointments mode of an example appointments channel may designate that only one view for the most imminent upcoming appointment is exposed.

Parking the electronic device on the appointments channel can activate passive user interaction for the example appointments channel illustrated in FIG. 9. For this example, the electronic device will create a playlist that includes channel view A3. Content associated with view A3 may be updated while the electronic device is parked on the channel. For example, the channel view A3 may include a countdown timer to indicate time until the appointment, which is periodically updated. In one example, each appointment has alternate views such as current time/time of appointment, and current time/time remaining until appointment, as well as others. After a cycle through the playlist (A3) is completed, the playlist may be updated according to the rules associated with the upcoming appointments such that the various alternate views associated with the exposed view is cycled through. After the current appointment has passed, the playlist is revised so that the next upcoming appointment (e.g., A4) is available and the expired appointment is reaped from the playlist.

An example news channel may have four channel views that are initially available in active interaction, where all views may be available for passive interaction in the glance view operating state. As shown in FIG. 9, one of the channel views (A3) out of four available views (A1–A4) are exposed to the glance view operating state for passive interaction. The channel view that is exposed to the glance view operating state is determined according to the rule set associated with the news channel for the current mode. For example, the rule set for an example news channel in a headlines mode may designate that a limited number of views for the most recent news headlines are exposed.

Parking the electronic device on the news channel can activate passive user interaction for the example news channel illustrated in FIG. 9. For this example, the electronic device will create a playlist that includes channel views N1–N4. Content associated with the news headlines mode of the news channel may be updated while the electronic device is parked on the channel. For example, the channel view N5 may later become available while parked on the news channel. After a cycle through the playlist (N4, N3, N2, N1) is completed, the playlist may be updated according to the rules associated with the news headlines such that the newly available view (e.g., N5) is exposed. The playlist is revised after each cycle through the playlist so that the newest news headlines appear first in the playlist. The news channel may have a maximum number of headlines such that old news items are periodically discarded as newer news headlines become available and the total number of news headlines exceeds the maximum.

The selection of views for the glance-view operating state is selected according to the rule set associated with the selected channel/mode. The views that are selected for the playlist may be pseudo randomly selected, or selected based priority. In one example, views from a messages channel/mode are added to the playlist based on a read/unread status such that only unread messages for the messages channel are available in the playlist. In another example, views from an upcoming appointments channel/mode are added to the playlist based on the most imminent upcoming appointment that has not passed. In still another example, exposed views from the local weather channel/mode are pseudo randomly selected for the playlist. In yet another example, exposed views from the headline news channel/mode are selected for the playlist based on priority where the newest unread headline is selected first.

An example customized channel may include views for local weather, upcoming appointments, and headline news. When the user parks the electronic device on the customized channel a playlist is created that includes a list of views, with at least one view from each channel/mode. The order of the items in the playlist for a customized channel is determined according to the priority order designated when the customized channel was configured. For the example, a first playlist may be created that includes views W2, A3, and N4 when the order of priority is local weather, upcoming appointments, and headline news. Each view in the first playlist is processed in order while the glance-view operating state is active. For this example, local weather view W2 is selected first, followed by imminent upcoming appointment A3, and newest news headline N4.

After news headline N4 is processed, the playlist is updated as reflected in the second playlist, which includes views W1, A3, and N3. Local weather view W1 is selected since it has not been recently viewed, appointment view A3 is selected since is still the most imminent upcoming appointment, and news headline N3 is selected since it is the most recent unviewed news headline. Each view in the second playlist is processed in order while the glance-view operating state is active. For this example, local weather view W1 is selected first, followed by imminent upcoming appointment A3, and newest news headline N3.

After news headline N4 is processed, the playlist is again updated as reflected in the third playlist, which includes views W2, A4, and N5. Local weather view W2 is selected since it has not been recently viewed, appointment view A4 is selected as the most imminent upcoming appointment since appointment A3 has expired, and news headline N5 is selected since it is now the most recent unviewed news headline. Each view in the third playlist is processed in order while the glance-view operating state is active. For this example, local weather view W2 is selected first, followed by imminent upcoming appointment A4, and newest news headline N5. The process of processing and updating the playlist continues to cycle while the glance-view operating state is active.

Example Customized Channel Views

An example customized channel that is arranged in accordance with the present invention is illustrated in FIG. 10. The customized channel references content from other channels. Thus, all of the views in the customized channel correspond to glance views that are periodically viewed according to a playlist when the glance view operating state is active, or manually advanced by active user interaction.

As illustrated in FIG. 10, a customized channel may include upcoming appointments, local weather, entertainment news, and unread messages. Each view in the customized channel is automatically advanced by the expiration of a timeout without user interaction. Alternatively, the user may manually advance the view from the playlist via activation of the "a" and "b" selectors. A detailed view associated with each glance view may be accessed by activation of the "d" selector (or enter function) as illustrated in the figure. Once the detailed view is accessed (e.g., "entertainment news" is selected with the "d" selector)., the detailed content associated with the glance view is displayed. The detailed content can be perused by activation of the "a" and "b" selectors, which operate similar to scroll bars within the detailed content. The activation of the "a" selector from the first detailed (extended) view will access the detail view for a previous main view (e.g., the main view for a previous main view in the customized channel), while activation of the "b" selector from the last detailed view will access a detailed view for a next main view (e.g., the main view for a next main view in the customized channel). Activation of the "d" selector (enter function) in the detailed view (or extended view) will cycle back to the main view. An unread message may be designated as "read" after a extended view is accessed for a particular unread message. Similarly, an unread news headline can be designated as "read" after accessing the detailed (or extended) view.

Example Transition Sequence Interaction

Figure 11:
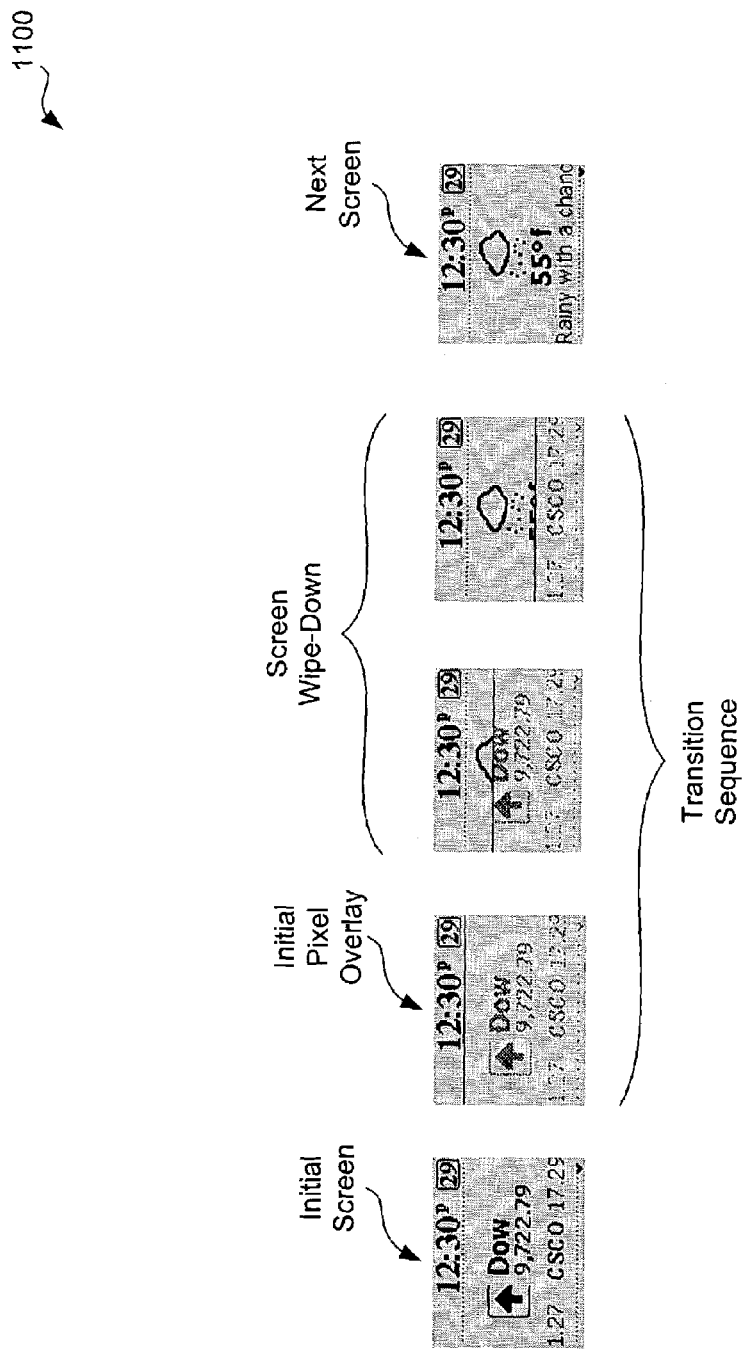
FIG. 11 is a diagram illustrating a transition sequence, which is arranged in accordance with the present invention.

An example transition sequence that is in accordance with the present invention is illustrated in FIG. 11. An initial screen corresponding to the current view changes to a next view through the transition sequence. An initial pixel overlay is displayed over the initial screen, creating a half-tone effect. A screen wipe-down sequence is then executed, where the next screen is brought into the display as the initial screen is removed from the display (See FIG. 11).

In one example, the transition sequence is initiated each time the channel is changed. In other example, the transition sequence is initiated whenever the mode is changed in a multi-mode channel. The transition sequence may also be initiated in the glance mode when the views are changed without user interaction.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for navigating stored content on a device in response that includes a display and an interface selection device:
    identifying a channel in the device, wherein the device includes stored content that is associated with a channel view for the channel;
    selecting the channel in response to at least one of passive and active user interaction;
    exposing a rule set that is associated with the channel when the channel is selected, wherein the rule set is configured such that the available channel view corresponds to an unread message that is associated with the channel when the channel is a messages channel;
    applying the exposed rule set to a channel view that is associated with the channel to provide an available channel view; and
    updating the display to view content associated with the available channel view.

2. A method for passively navigating stored content on a device that includes a display and an interface selection device:
    identifying a current channel in the device, wherein the device includes stored content that is associated with channel views for the current channel;
    exposing channel views that are associated with the current channel when the device is in a glance-view operating state; creating a playlist when the device enters the glance-view operating state, wherein the playlist includes a list of items that identify channel views that are exposed in the device for the current channel;
    processing the playlist while the device is in the glance view operating state, wherein processing includes:
    selecting a next item in the playlist that corresponds to an unprocessed item from the playlist;
    activating the channel view that is associated wit the selected item; and
    updating the display to indicate the activated channel view, wherein the activated channel view includes content that is formatted for glanceable viewing; and
    updating the playlist when the device is in the glance view operating state and every item in the playlist has been processed.

3. The method of claim 2, further comprising: entering the glance view operating state after a predetermined time interval has expired without active user interaction.

4. The method of claim 2, further comprising: exiting the glance view operating state after an active user interaction.

5. The method of claim 2, farther comprising: exposing a rule set that is associated with the current channel when the device enters the glance view operating state.

6. The method of claim 5, wherein creating the playlist further comprises: applying the rule set that is associated with the current channel to select a channel view for the playlist.

7. The method of claim 6, wherein the rule set includes at least one of: selecting a previously unviewed channel view, electing a least recently accessed channel view, selecting a highest priority channel view, selecting a most recently received channel view, selecting an alternate view, randomly selecting a channel view, pseudo-randomly selecting a channel view, and selecting a limited number of channel views.

8. The method of claim 2, wherein exposing channel views further comprises: exposing a rule set that is associated with the current channel when the device enters the glance view operating stare, applying the rule set to the current channel, and exposing channel views that satisfy the rule set.

9. The method of claim 2, wherein the current channel corresponds to a customized channel, and wherein every view in the customized channel is associated with another channel in the device.

10. The method of claim 2, wherein the current channel corresponds to a customized channel that references a first channel and a second channel, and wherein the first channel has a different rule set from the second channel.

11. The method of claim 2, wherein the current channel corresponds to a customized channel that references a first channel and a second channel, and wherein creating the playlist includes identifying a first channel view from the first channel, and identifying a second channel view from the second channel.

12. The method of claim 11, wherein the step of identifying the first channel view further comprises: applying a first rule set that is associated with the first channel to select a channel view for the playlist, and applying a second rule set that is associated with the second channel to select another channel view for the playlist.

13. A method as in claim 2, wherein processing the playlist further comprises: formatting content that is associated with the activated channel view such that the corresponding display is glanceable.

14. A method as in claim 2, wherein processing the playlist further comprises: retrieving glanceable content that is associated with the channel view that is associated with the selected item.

15. A method as in claim 2, wherein processing the playlist further comprises: idling for a predetermined time interval before selecting the next item in the playlist.

16. A method as in claim 2, wherein updating the display farther comprises: activating a transition sequence that transitions between the current channel view and the next channel view on the display.

17. A method as in claim 16, wherein the transition sequence corresponds to at least one of: a display screen wipe effect, a display screen fade effect, a half-tone pixel effect, and an audible effect.

18. An apparatus, comprising:
    a display;
    a user interface that includes a selector; and
    an electronic system that is arranged to interact with the user interface and the display, wherein the electronic system is configured to:
    identify a current operating state, wherein the operating state corresponds to a glance-view operating state when a predetermined time interval expires without activation of the selector;
    identify a current channel that is associated wit stored content;
    expose channel views that are associated with the current channel when the device is in the glance-view operating state;
    create a playlist when the device enters the glance-view operating state, wherein the playlist includes a list of items that identify channel views that are exposed in the device for the current channel;
    display content that is associated with items in the playlist while the device is in the glance-view operating state; and update the playlist when the device is in the glance view operating state and every item in the playlist has been processed.

19. The apparatus of claim 18, wherein the electronic system is further arranged to exit the glance view operating state after an active user interaction with the selector.

20. A system far passively navigating glanceable content, comprising:
- a means for identifying that is arranged to identify a current channel in the device, wherein the system is arranged to store content that is associated with the current channel;
- a means to activate that is arranged to activate a glance-view operating state;
- a means for exposing channel views that is arranged to identify channel views that are available in the glance-view operating state;
- a means for creating that is arranged to create a playlist when the device enters the glance-view operating state, wherein the playlist includes a list of items that are associated with the identified channel views;
- a means for processing that is arranged to process the playlist while the system is in the glance view operating state, wherein the means for processing further comprises: a means for selecting that is arranged to select a next item from the playlist, and a means for displaying that is arranged to display glanceable content that is associated with the selected item from the playlist; and
- a means for updating that is arranged to update the playlist when the system is in the glance view operating state and every item in the playlist has been processed.

21. A system as in claim 20, wherein the means for processing further comprises: a means for formatting that is arranged to format the content for the channel view that is associated with the selected item from the playlist such that the corresponding display is glanceable.

* * * * *